United States Patent
Kondo et al.

(10) Patent No.: US 8,139,152 B2
(45) Date of Patent: Mar. 20, 2012

(54) IMAGE PROCESSING APPARATUS, IMAGE PROCESSING METHOD AND PROGRAM

(75) Inventors: Tetsujiro Kondo, Tokyo (JP); Masanori Kanemaru, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 12/720,367

(22) Filed: Mar. 9, 2010

(65) Prior Publication Data

US 2010/0165129 A1    Jul. 1, 2010

Related U.S. Application Data

(62) Division of application No. 10/552,466, filed as application No. PCT/JP2005/002523 on Feb. 10, 2005, now Pat. No. 7,710,498.

(30) Foreign Application Priority Data

Feb. 13, 2004   (JP) ................................ 2004-037249
Feb. 13, 2004   (JP) ................................ 2004-037250

(51) Int. Cl.
*H04N 7/01*    (2006.01)
*H04N 11/20*   (2006.01)

(52) U.S. Cl. ......... 348/441; 348/443; 348/452; 348/620

(58) Field of Classification Search .................. 348/452, 348/458–459, 441, 581, 584, 561, 704, 208.13, 348/241, 221.1, 63, 153, 159, 445, 607, 699, 348/700, 598, 586, 208.4, 443; 382/275, 382/254–255, 190, 299; H04N 7/01, 11/20
See application file for complete search history.

(56) References Cited

U.S. PATENT DOCUMENTS 5,557,684 A    9/1996  Wang et al.
(Continued)

FOREIGN PATENT DOCUMENTS

EP    1 400 927    6/2002
(Continued)

OTHER PUBLICATIONS

Office Action issued Sep. 21, 2010, in Japanese Patent Application No. 2005-034674.

*Primary Examiner* — Trang U Tran
(74) *Attorney, Agent, or Firm* — Oblon, Spivak, McClelland, Maier & Neustadt, L.L.P.

(57) ABSTRACT

An apparatus for processing an image includes a motion vector detector, a motion-blurring-mitigated image generator, and a spatial resolution creation unit. The motion vector detector is configured to detect a motion vector by using an image that is made up of multiple pixels and acquired by an image sensor having time integration effects. The motion-blurring-mitigated image generator is configured to generate a motion-blurring-mitigated image in which motion blurring of a moving object is mitigated by using the motion vector detected by the motion vector detector on the assumption that a pixel value of pixel of the moving object in the image is a value obtained by integrating, in a time direction, a pixel value of each pixel in which no motion blurring that corresponds to the moving object occur as it is moved. The spatial resolution creation unit is configured to generate an image that has a higher spatial resolution than that of the image made up of the multiple pixels by using the motion vector detected by the motion vector detector and the motion-blurring-mitigated image from the motion-blurring-mitigated image generator.

19 Claims, 29 Drawing Sheets

U.S. PATENT DOCUMENTS

| | | | |
|---|---|---|---|
| 5,873,830 A * | 2/1999 | Hossack et al. | 600/447 |
| 5,940,539 A | 8/1999 | Kondo et al. | |
| 2004/0021775 A1 | 2/2004 | Kondo et al. | |
| 2004/0028259 A1 | 2/2004 | Kondo et al. | |
| 2004/0047513 A1 | 3/2004 | Kondo et al. | |
| 2004/0061795 A1 | 4/2004 | Kondo et al. | |
| 2004/0062450 A1 | 4/2004 | Kondo et al. | |
| 2004/0075749 A1 | 4/2004 | Kondo et al. | |
| 2004/0081335 A1 | 4/2004 | Kondo et al. | |
| 2006/0192857 A1 | 8/2006 | Kondo et al. | |

FOREIGN PATENT DOCUMENTS

| | | |
|---|---|---|
| EP | 1 396 819 | 3/2004 |
| JP | 6-14323 | 1/1994 |
| JP | 6-350897 | 12/1994 |
| JP | 10-155139 | 6/1998 |
| JP | 2000-134585 | 5/2000 |
| JP | 2000-224593 | 8/2000 |
| JP | 2002-199349 | 7/2002 |
| JP | 2002-312782 | 10/2002 |
| JP | 2002-373330 | 12/2002 |
| JP | 2002-373336 | 12/2002 |
| JP | 2002-373337 | 12/2002 |
| JP | 2003-6650 | 1/2003 |
| JP | 2003-6656 | 1/2003 |
| JP | 2003-8991 | 1/2003 |
| JP | 2003-16455 | 1/2003 |
| JP | 2003-204528 | 7/2003 |
| JP | 2003-233817 | 8/2003 |

* cited by examiner

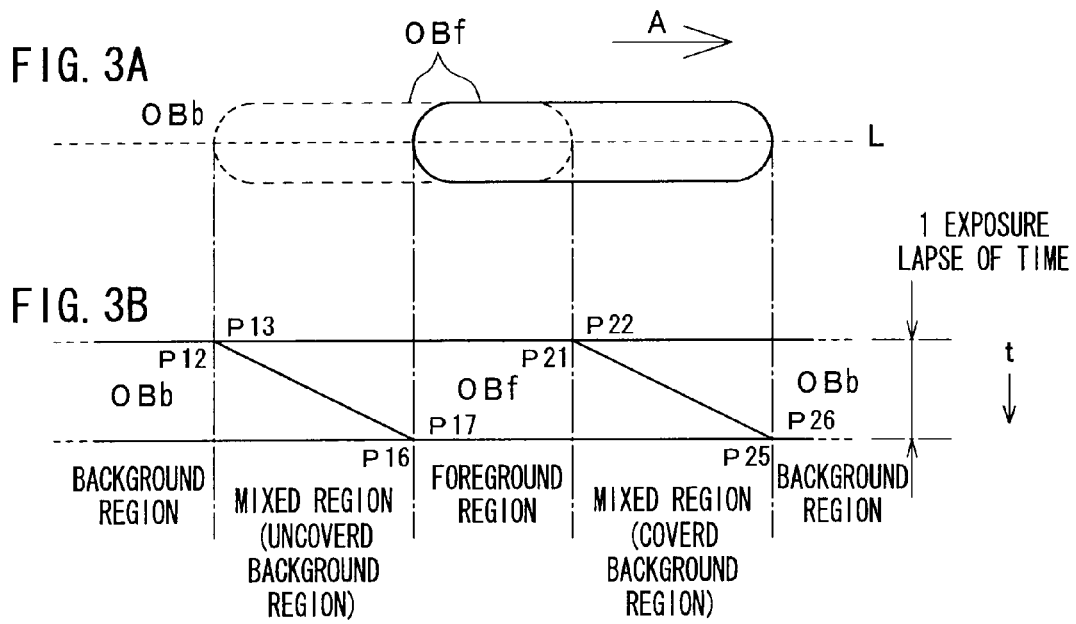
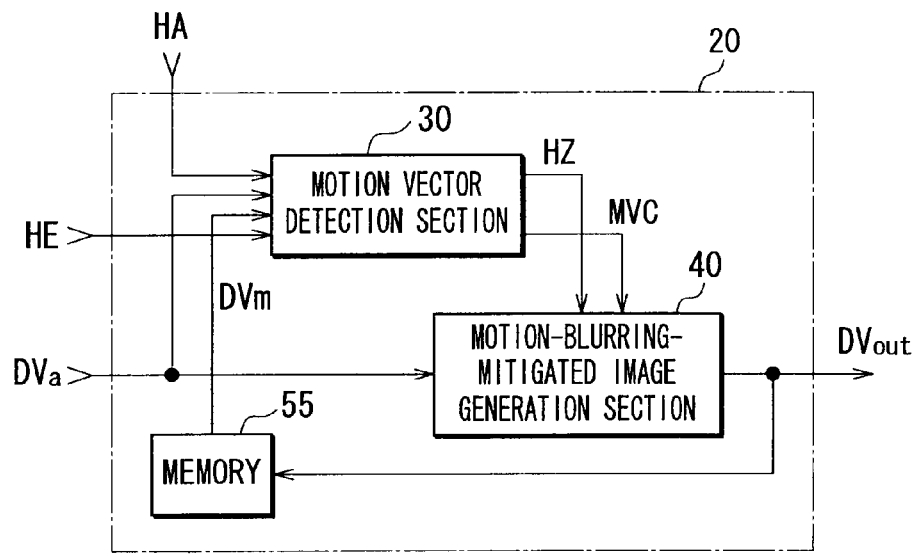

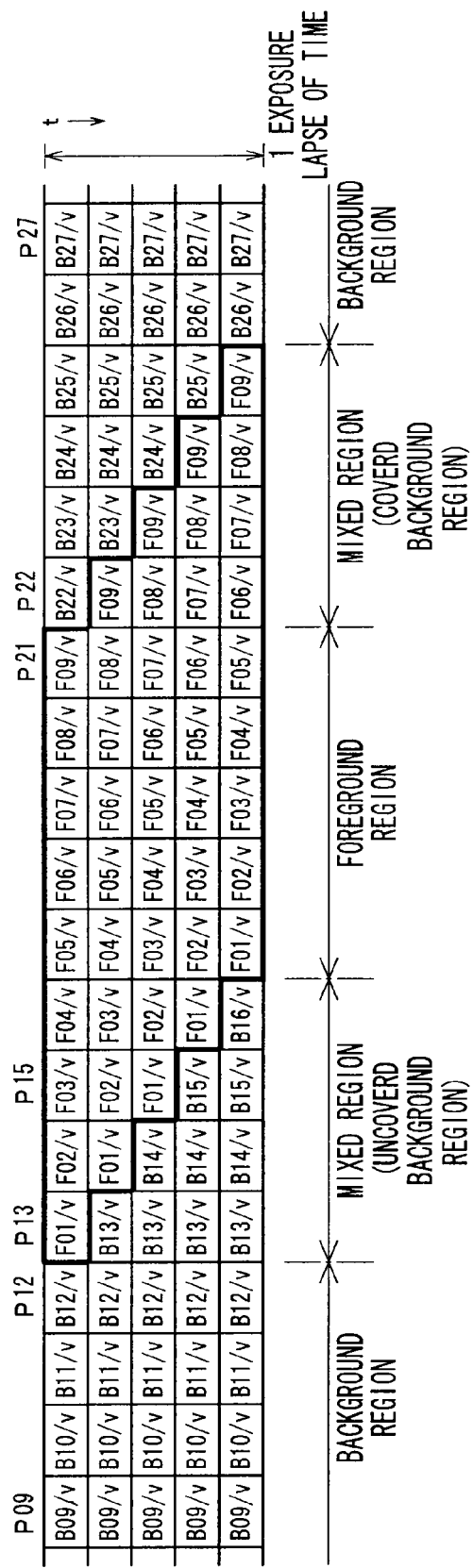

| REGION DETERMINATION | STILL/MOVING DECISION ON FRAMES #n-2 AND #n-1 | STILL/MOVING DECISION ON FRAMES #n-1 AND #n | STILL/MOVING DECISION ON FRAMES #n AND #n+1 | STILL/MOVING DECISION ON FRAMES #n+1 AND #n+2 | DECISION LOGIC |
|---|---|---|---|---|---|
| STILL REGION | | STILL | STILL | | OR |
| COVERD BACKGROUND REGION | STILL | MOVING | | | AND |
| UNCOVERD BACKGROUND REGION | | | MOVING | STILL | AND |
| MOVING REGION | | MOVING | MOVING | | AND |

| C01 | C02 | C03 | C04 | C05 | C06 | C07 | C08 | C09 | C10 | C11 | C12 | C13 |
|---|---|---|---|---|---|---|---|---|---|---|---|---|
| F01/v | F02/v | F03/v | F04/v | F05/v | F06/v | F07/v | F08/v | F09/v | | | | |
| | F01/v | F02/v | F03/v | F04/v | F05/v | F06/v | F07/v | F08/v | F09/v | | | |
| | | F01/v | F02/v | F03/v | F04/v | F05/v | F06/v | F07/v | F08/v | F09/v | | |
| | | | F01/v | F02/v | F03/v | F04/v | F05/v | F06/v | F07/v | F08/v | F09/v | |
| | | | | F01/v | F02/v | F03/v | F04/v | F05/v | F06/v | F07/v | F08/v | F09/v |

FIG. 22A
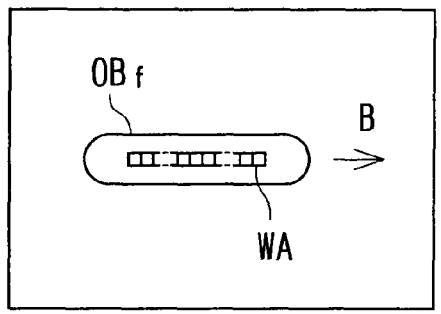
FIG. 22B
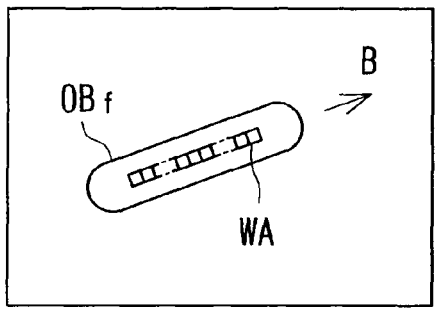
FIG. 23
TARGET PIXEL
| Y-4/v | Y-3/v | Y-2/v | Y-1/v | Y0/v | Y1/v | Y2/v | Y3/v | Y4/v | Y5/v | Y6/v | Y7/v | Y8/v |
| Y-5/v | Y-4/v | Y-3/v | Y-2/v | Y-1/v | Y0/v | Y1/v | Y2/v | Y3/v | Y4/v | Y5/v | Y6/v | Y7/v |
| Y-6/v | Y-5/v | Y-4/v | Y-3/v | Y-2/v | Y-1/v | Y0/v | Y1/v | Y2/v | Y3/v | Y4/v | Y5/v | Y6/v |
| Y-7/v | Y-6/v | Y-5/v | Y-4/v | Y-3/v | Y-2/v | Y-1/v | Y0/v | Y1/v | Y2/v | Y3/v | Y4/v | Y5/v |
| Y-8/v | Y-7/v | Y-6/v | Y-5/v | Y-4/v | Y-3/v | Y-2/v | Y-1/v | Y0/v | Y1/v | Y2/v | Y3/v | Y4/v |
MOVEMENT QUANTITY (v=5)
N NUMBER OF PIXELS (N=6) | N NUMBER OF PIXELS (N=6)
PROCESSING REGION

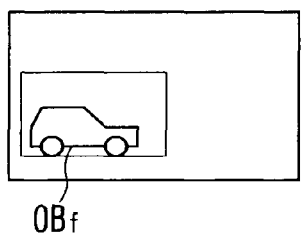
OBf
FIG. 24A
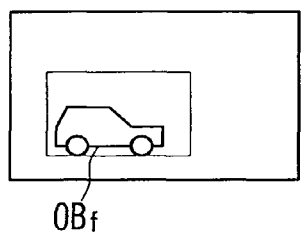
OBf
FIG. 24B
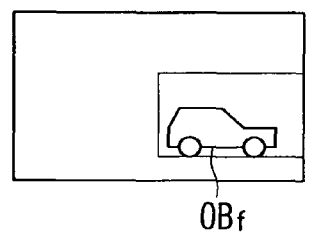
OBf
FIG. 24C
FIG. 25A  FIG. 25B  FIG. 25C
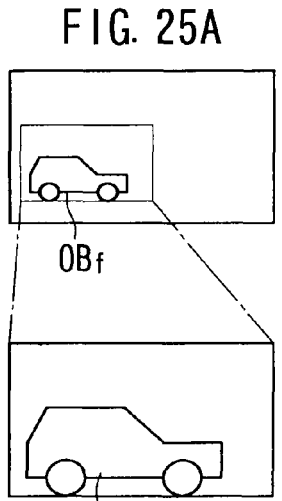
OBf FIG. 25D
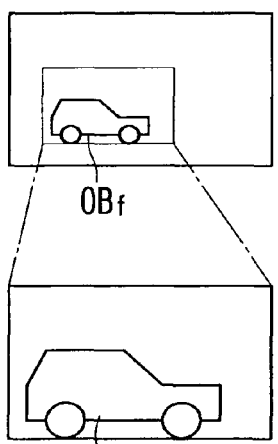
OBf FIG. 25E
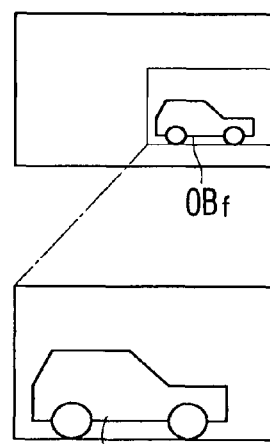
OBf FIG. 25F

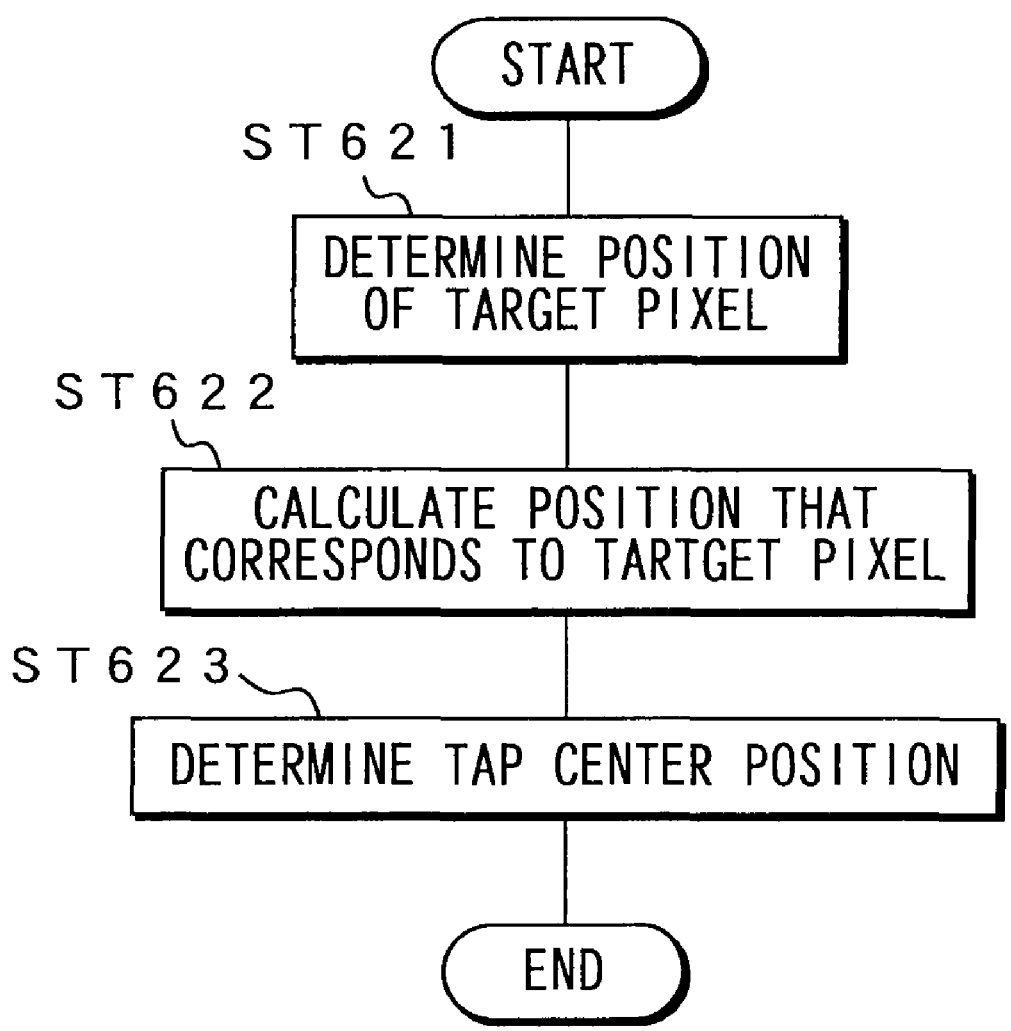

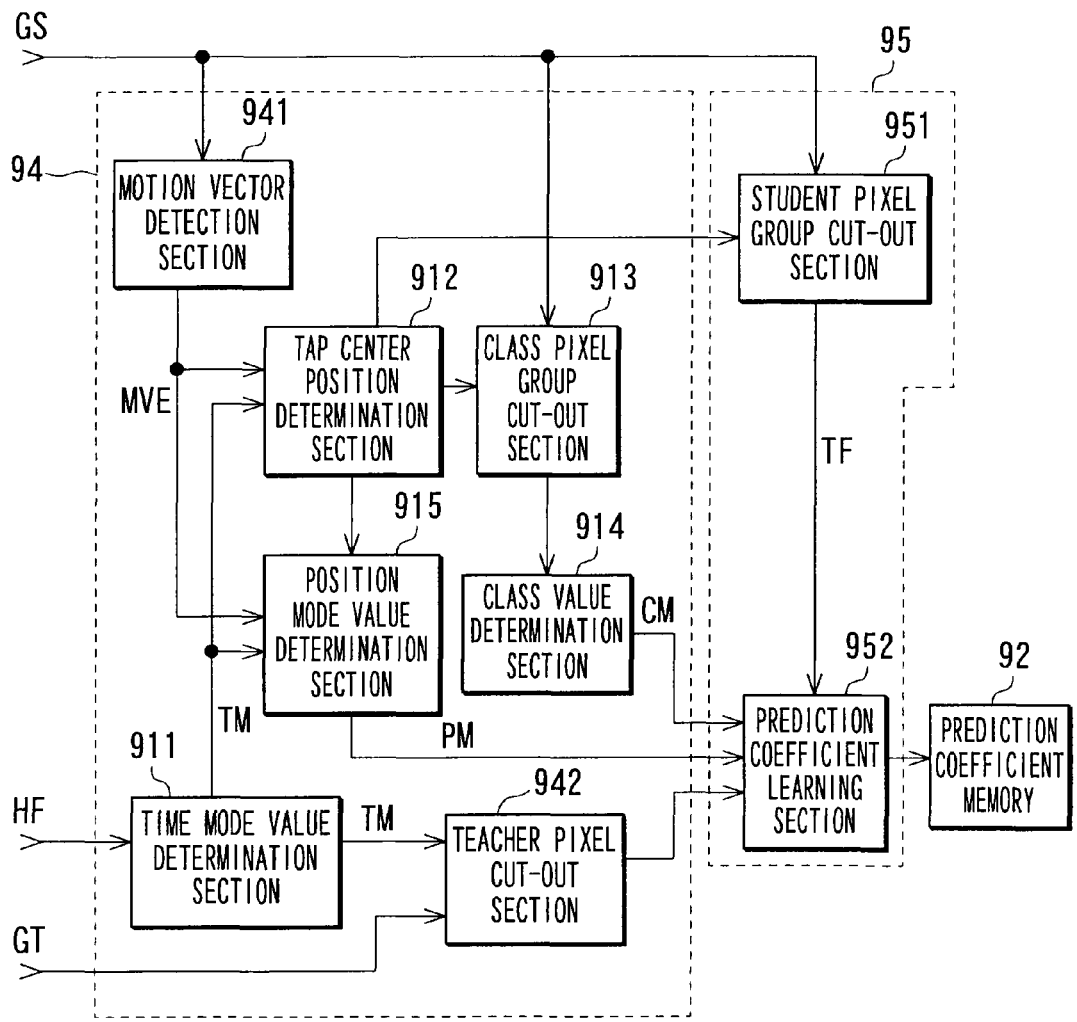
F I G. 4 0

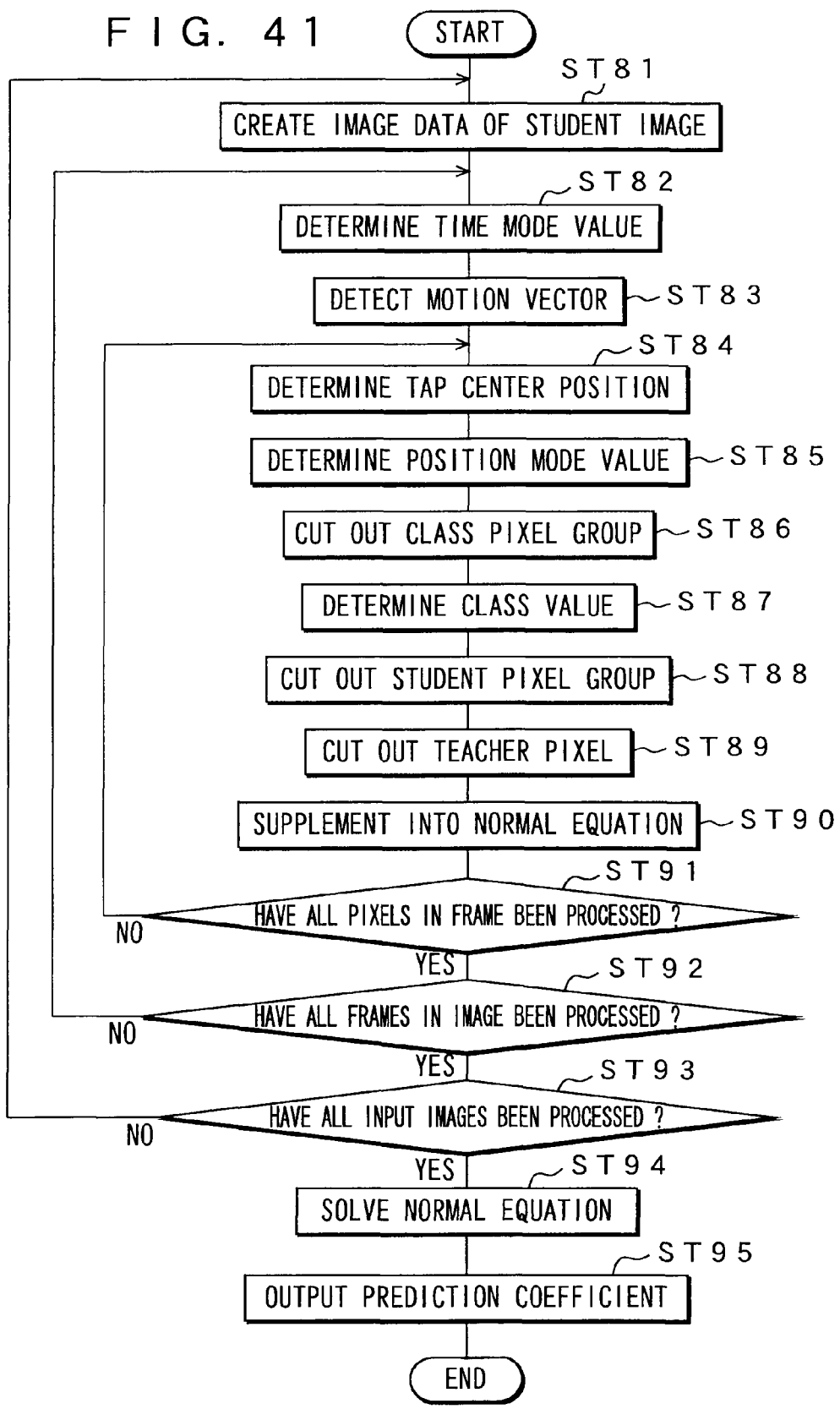

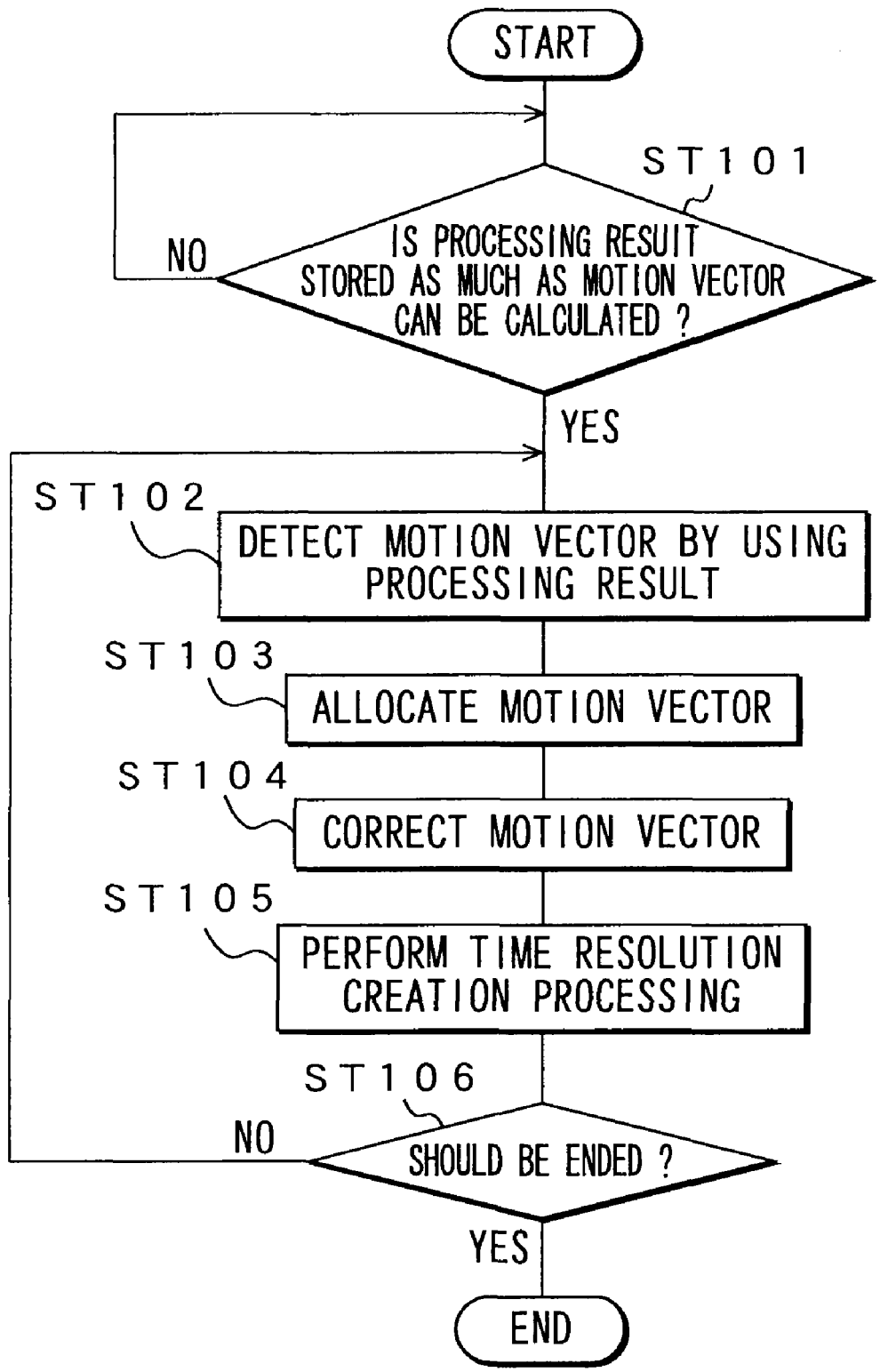

IMAGE PROCESSING APPARATUS, IMAGE PROCESSING METHOD AND PROGRAM

CROSS-REFERENCE TO RELATED APPLICATIONS

This application is a divisional of U.S. application Ser. No. 10/552,466, filed on Oct. 7, 2005, which is the National Stage of International Application No. PCT/JP05/02523, filed on Feb. 10, 2005 and claims priority to prior Japanese Patent Application Nos. 2004-037250 filed on Feb. 13, 2004, and 2004-037249 filed on Feb. 13, 2004. The entire contents of U.S. Ser. No. 10/522,466 are incorporated herein by reference.

TECHNICAL FIELD

The present invention relates to an apparatus, a method, and a program for processing an image. More specifically, they detect a motion vector by using an image made up of multiple pixels and acquired by an image sensor having time integration effects and by using the detected motion vector and the image made up of the multiple pixels, they generate an image having a higher time resolution than that of this image. They also mitigate motion blurring that occurs in a moving object in an image by using a detected motion vector.

BACKGROUND ART

According to a conventional frame rate conversion system, for example, a 2-3 pull down system in telecine conversion, a suite of processing to repeat an image of one frame of a film twice and processing to repeat it three times has been periodically performed to convert a frame rate to another. As disclosed in Japanese Patent Application Publication No. 2002-199349, by learning a relationship between a teacher image signal having a post-conversion frame rate and the corresponding student image signals each having a pre-conversion frame rate for each classification of properties about the student image signals having the pre-conversion frame rate to convert an image signal having the pre-conversion frame rate into an image signal having the post-conversion frame rate by using a prediction coefficient obtained as a result of this learning, it has been done to obtain signal of a high-definition time resolution image in which natural movements are realized.

Meanwhile, to perform image processing that is different from such the frame rate conversion, a motion vector is required in this different image processing in some cases, so that if a motion vector is detected for each image processing and used, it requires a complicated configuration. Further, if a motion vector to be used in image processing is not detected properly, such the image processing fails to obtain a desired image, for example, a high-definition image in which natural movements are realized.

DISCLOSURE OF THE INVENTION

In view of the above, to efficiently perform image processing by use of a motion vector and obtain a desired image through the image processing, an apparatus for processing an image related to the present invention comprises: motion vector detection means for detecting a motion vector by using an image that is made up of multiple pixels and acquired by an image sensor having time integration effects; time resolution creation means for generating an image that has a higher time resolution than that of the image made up of the multiple pixels by using the motion vector detected by the motion vector detection means and the image made up of the multiple pixels; and motion-blurring-mitigated image generation means for generating a motion-blurring-mitigated image in which motion blurring of a moving object is mitigated by using the motion vector detected by the motion vector detection means on the assumption that a pixel value of pixel of the moving object in the image is a value obtained by integrating, in a time direction, a pixel value of each pixel in which no motion blurring that corresponds to the moving object occur as it is moved.

A method for processing an image related to the present invention comprises: motion vector detection step of detecting a motion vector by using an image made up of multiple pixels acquired by an image sensor having time integration effects; time resolution creation step of generating an image that has a higher time resolution than that of the image made up of the multiple pixels by using the motion vector detected in the motion vector detection step and the image made up of the multiple pixels; and motion-blurring-mitigated image generation step of generating a motion-blurring-mitigated image in which motion blurring of a moving object is mitigated by using the motion vector detected in the motion vector detection step on the assumption that a pixel value of pixel of the moving object in the image is a value obtained by integrating, in a time direction, a pixel value of each pixel in which a no motion blurring that corresponds to the moving object occur as it is moved.

A program related to the present invention allowing a computer to perform: motion vector detection step of detecting a motion vector by using an image made up of multiple pixels acquired by an image sensor having time integration effects; time resolution creation step of generating an image that has a higher time resolution than that of the image made up of the multiple pixels by using the motion vector detected in the motion vector detection step and the image made up of the multiple pixels; and motion-blurring-mitigated image generation step of generating a motion-blurring-mitigated image in which motion blurring of a moving object is mitigated by using the motion vector detected in the motion vector detection step on the assumption that a pixel value of pixel of the moving object in the image is a value obtained by integrating, in a time direction, a pixel value of each pixel in which no motion blurring that corresponds to the moving object occur as it is moved.

In the present invention, the motion vector is detected by using the image that is made up of multiple pixels and acquired by an image sensor having time integration effects, so that the motion vector for the image that has the high time resolution can be detected. By using this detected motion vector and the image made up of the multiple pixels, the image that has a high time resolution can be generated. Further, on the assumption that a pixel value of the moving object is a value obtained by integrating, in a time direction, a pixel value of each pixel in which no motion blurring that corresponds to the moving object occur as it is moved, motion blurring that has occurred in the moving object is mitigated by using the motion vector corrected in accordance with an exposure lapse of time. Further, by using the motion-blurring-mitigated image in which motion blurring is mitigated as the image made up of the multiple pixels, an image having a higher time resolution is generated.

According to the present invention, the motion vector is detected by using the image that is made up of the multiple pixels and acquired by the image sensor having the time integration effects, so that the detected motion vector and the image made up of the multiple pixels are used to generate an image that has a higher time resolution than that of the image made up of the multiple pixels. Further, on the assumption that a pixel value of the moving object in the image is a value obtained by integrating, in a time direction, a pixel value of each pixel in which no motion blurring that corresponds to the moving object occur as it is moved, motion blurring that has occurred in the moving object is mitigated on the basis of the detected motion vector. It is thus unnecessary to perform motion vector detection separately in a process of generation of the image having a high time resolution and a process of mitigating motion blurring, respectively, thereby enabling the generation of the image with the high time resolution and the mitigation of the motion blurring to be performed with simple configuration.

Further, the generation of the image having a high time resolution is done by using a motion-blurring-mitigated image in which motion blurring is mitigated, so that it is possible to suppress motion blurring of the image that has the high time resolution.

Furthermore, the motion vector is detected by using multiple images, each of which is made up of multiple pixels, acquired by the image sensor and this detected motion vector is used in allocation so that the motion vector may be generated for the image having a high time resolution, thereby generating the image having the high time 2J resolution properly. Further, the detected motion vector is corrected in accordance with an exposure lapse of time, so that it is possible to mitigate the motion blurring properly even if a shutter operation or the like is performed.

Furthermore, by using the motion vector detected by the motion vector detection means, the motion vector of the target pixel in the image to be generated is decided, the multiple pixels that correspond to the target pixel is extracted as a class tap from the image acquired by the image sensor, and a class that corresponds to the target pixel is decided on the basis of a pixel value of this class tap. Further, on the assumption that between a first image having a time resolution that corresponds to the image acquired by the image sensor and a second image that has a higher time resolution than that of the first image, a prediction coefficient for predicting the target pixel from the multiple pixels in the first image that corresponds to the target pixel in the second image is used according to the determined class, multiple pixels that correspond to a target pixel in an image to be generated are extracted from the image acquired by the image sensor and a prediction value that corresponds to the target pixel is generated by performing one-dimension linear combination on the prediction coefficient and the prediction tap, thereby generating an image having a high time resolution. This allows a high-definition image with a higher time resolution in which natural movements are realized to be obtained.

BRIEF DESCRIPTION OF THE DRAWINGS

FIGS. 3A and 3B are explanatory diagrams of a shot image;
FIG. 4 is an explanatory diagram of time-directional division operation of pixel values;
FIG. 5 is a block diagram for showing a configuration of an apparatus for processing an image;
FIG. 9 is a diagram for showing image data read out of an image memory;
FIG. 15 is a diagram for showing adjustment-processing units;
FIGS. 22A and 22B are diagrams each for showing an example of setting up a processing region;
FIG. 23 is an explanatory diagram of time-wise mixture of actual world variables in a processing region;
FIGS. 24A-24C are diagrams each for showing an example where an object moves;
FIGS. 25A-25F are diagrams each for showing an expanded display image with tracking the object;
FIG. 39 is a flowchart for showing tap center position determination processing;

FIG. 40 is a block diagram for showing a configuration of a learning device;

FIG. 41 is a flowchart for showing processing to learn a prediction coefficient;

FIG. 42 is a flowchart for showing operations in a case where time resolution creation processing is combined.

BEST MODE FOR CARRYING OUT THE INVENTION

Figure 1:
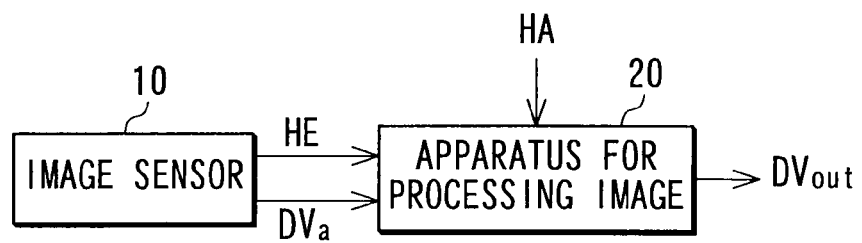
FIG. 1 is a block diagram for showing a configuration of a system to which the present invention is applied.
Figure 2:
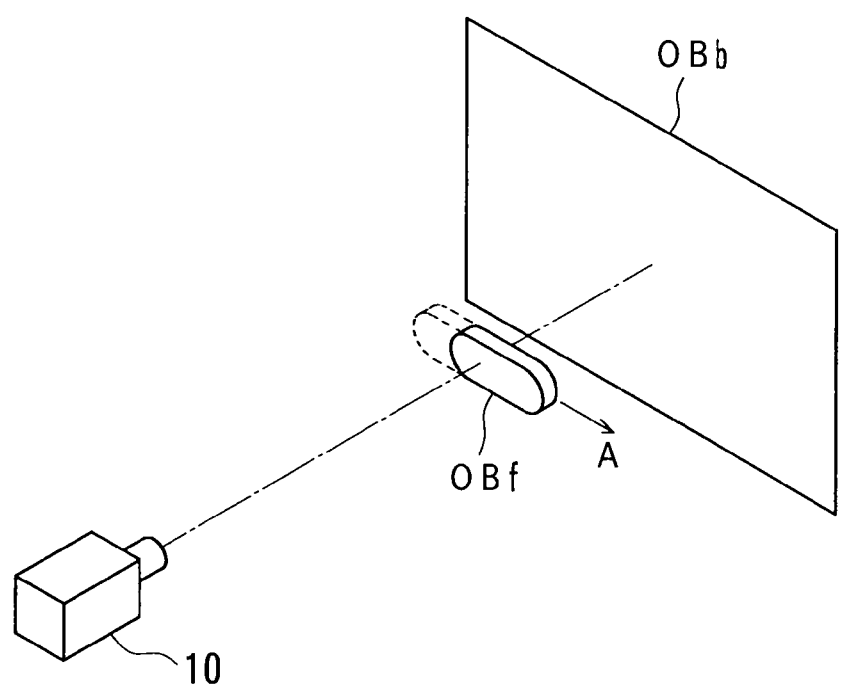
FIG. 2 is a diagram for illustrating image shooting by an image sensor.

The following will describe one embodiment of the present invention with reference to drawings. FIG. 1 is a block diagram for showing a configuration of a system to which the present invention is applied. An image sensor 10 that is constituted of a video camera etc. equipped with a charge-coupled device (CCD) area sensor or a CMOS area sensor, which is a solid-state image sensing device, shoots a actual world. For example, when a moving object OBf that corresponds to a foreground moves in an arrow direction "A" between the image sensor 10 and an object OBb that corresponds to a background as shown in FIG. 2, the image sensor 10 shoots the object OBb that corresponds to the background as well as the moving object OBf that corresponds to the foreground.

This image sensor 10 is made up of a plurality of detection elements, each of which has time integration effects, and so integrates, for an exposure lapse of time, electrical charge generated in accordance with incoming light for each of the detection elements. That is, the image sensor 10 performs photoelectric transfer in converting the incoming light into the electrical charge, to accumulate it in units of, for example, one frame period. In accordance with a quantity of the accumulated electrical charge, it generates pixel data and then uses this pixel data to generate image data DVa having a desired frame rate and supplies the data to an apparatus 20 for processing an image. The image sensor 10 is further provided with shutter functions, so that if image data DVa is generated by adjusting an exposure lapse of time in accordance with a shutter speed, it supplies the apparatus 20 for processing the image with a parameter HE for exposure lapse of time, which is indicative of the exposure lapse of time. This parameter HE for exposure lapse of time indicates a shutter-open lapse of time in one frame period in value of, for example, "0" through "1.0", which value is set to 1.0 when the shutter functions are not used and 0.5 when the shutter lapse of time is ½ of the frame period.

The apparatus 20 for processing the image extracts significant information buried in image data DVa owing to the time integration effects exerted at the image sensor 10 and utilizes this significant information to mitigate motion blurring due to the time integration effects generated on the moving object OBf that corresponds to the moving foreground. It is to be noted that the apparatus 20 for processing the image is supplied with region selection information HA for selecting an image region in which motion blurring is mitigated.

FIG. 3 are explanatory diagrams of a shot image given by the image data DVa. FIG. 3A shows an image obtained by shooting the moving object OBf that corresponds to the moving foreground and the object OBb that corresponds to the background at rest. Here, it is supposed that the object OBf that corresponds to the foreground is moving horizontally in the arrow direction "A".

FIG. 3B shows a relationship between the image and time along a line L indicated by a broken line of FIG. 3A. In a case where a length over which the moving object OBf moves along the line L is, for example, as much as nine pixels and it moves by as much as five pixels in one exposure lapse of time, a front end thereof located at pixel location P21 and a rear end thereof located at pixel location P13 when a frame period starts move to pixel locations P25 and P17, respectively, when the exposure lapse of time ends. Further, if the shutter functions are not in use, an exposure lapse of time in one frame equals one frame 1D period, so that the front end and the rear end thereof are located to pixel locations P26 and P18, respectively, when the next frame period starts. For simplicity of explanation, it is supposed that the shutter functions are not used unless otherwise specified.

Therefore, in a frame period along the line L, a portion thereof ahead of pixel location P12 and a portion thereof behind pixel location P26 constitute a background region comprised of only background component. Further, a portion thereof over pixel locations P17-P21 constitutes a foreground region comprised of only foreground component. A portion thereof over pixel locations P13-P16 and a portion thereof over pixel locations P22-P25 each constitute a mixed region where foreground component and background component are mixed. The mixed regions are classified into a covered background where background component is covered by a foreground as time passes by and an uncovered background region where the background component appears as time passes by. It is to be noted that, in FIG. 3B, a mixed region located on the side of a front end of a foreground object in a direction in which the foreground object goes is the covered background region and a mixed region located on the side of its rear end is the uncovered background region. Thus, the image data DVa contains an image that includes a foreground region, a background region, a covered background region, or an uncovered background region.

It is to be noted that one frame is short in time, so that on the assumption that the moving object OBf that corresponds to a foreground is rigid and moves at the same speed, a pixel value in one exposure lapse of time is subject to time-directional division, to be divided by a virtual division number to equal time intervals as shown in FIG. 4.

The virtual division number is set in accordance with a movement quantity v, in one frame period, of the moving object that corresponds to the foreground. For example, if the movement quantity v in one frame period is five pixels as described above, the virtual division number is set to "5" according to the movement quantity v to divide the one frame period into five equal time intervals.

Further, a pixel value, in one frame period, of pixel location Px obtained when the object OBb that corresponds to the background is shot is assumed to be Bx and pixel values obtained for pixels when the moving object OBf that corresponds to the foreground and has a length of as many as nine pixels along the line L is shot at rest are assumed to be F09 (on the front end side) through F01 (on the rear end side).

In this case, for example, pixel value DP15 of pixel location P15 is given by Equation 1:

$$DP15 = B15/v + B15/v + F01/v + F02/v + F03/v \qquad (1)$$

This pixel location P15 contains a background component as much as two divided virtual lapses of time (frame period/v) and a foreground component as much as three divided virtual lapses of time, so that a mixture ratio α of the background component is ⅖. Similarly, for example, pixel location P22 contains the background component as much as one divided virtual lapse of time and the foreground component as much as four divided virtual lapses of time, so that the mixture ratio α is ⅕.

Since it is assumed that the moving object that corresponds to the foreground is rigid and moves at the same speed so that an image of the foreground may be displayed rightward as much as five pixels in the next frame, foreground component (F01/v), for example, of pixel location P13 in a first divided virtual lapse of time is the same as foreground component of pixel location P14 in a second divided virtual lapse of time, foreground component of pixel location P15 in a third divided virtual lapse of time, foreground component of pixel location P16 in a fourth divided virtual lapse of time, and foreground component of pixel location P17 in a fifth divided virtual lapse of time, respectively. Foreground component (F02/v) of pixel location P14 in a first divided virtual lapse of time through foreground component (F09/v) of pixel location P21 in a first divided virtual lapse of time are exactly alike a case of the foreground component (F01/v).

Therefore, it is possible to give pixel value DP of each pixel location by using a mixture ratio α as indicated in Equation 2. In Equation 2, "FE" represents a sum of foreground components.

$$DP=\alpha \cdot B+FE \qquad (2)$$

Since the foreground component thus moves, different foreground components are added to each other in one frame period, so that a foreground region that corresponds to a moving object contains motion blurring. Accordingly, the apparatus 20 for processing the image extracts the mixture ratio α as significant information buried in the image data DVa and utilizes this mixture ratio α, to generate image data DVout in which motion blurring of the moving object OBf that corresponds to the foreground is mitigated.

FIG. 5 is a block diagram for showing a configuration of the apparatus 20 for processing the image. Image data DVa supplied to the apparatus 20 is in turn supplied to a motion vector detection section 30 and a motion-blurring-mitigated image generation section 40. Further, region selection information HA and parameter HE for exposure lapse of time are supplied to the motion vector detection section 30. Furthermore, image data DVm read out of a memory 55, which will be described later, is supplied to the motion vector detection section 30. The motion vector detection section 30 sequentially extracts processing regions subject to motion-blurring-mitigation processing based on the region selection information HA. It also detects a motion vector MVC that corresponds to the moving object in the processing region by using image data in the processing region of the image data DVa or the image data DVm and supplies it to the motion-blurring-mitigated image generation section 40. For example, it sets up a target pixel that corresponds to a position of a moving object in any one of at least first and second images that occur successively in time, to detect a motion vector that corresponds to this target pixel by using these first and second images. Further, it generates processing region information HZ indicative of the processing region and supplies the information to the motion-blurring-mitigated image generation section 40. In addition, it updates the region selection information HA in accordance with movement of the object of the foreground, to move the processing region as the moving object moves.

The motion-blurring-mitigated image generation section 40 specifies a region or calculates a mixture ratio based on the motion vector MVC, the processing region information HZ, and the image data DVa and uses the calculated mixture ratio to separate foreground component and background component from each other. Furthermore, it performs a motion blurring adjustment on an image of the separated foreground component to generate a foreground component image data DBf that is image data of the motion-blurring-mitigated object image. Further, it combines a motion-blurring-mitigated foreground region image based on the foreground component image data DBf into a background image based on the background component image data DBb to generate image data DVout of the motion-blurring-mitigated image. This image data DVout is supplied to the memory 55 and an image display apparatus, not shown. In this case, the foreground region image, which is the motion-blurring-mitigated object image, can be combined into a space-time position that corresponds to the detected motion vector MVC, to output a motion-blurring-mitigated image of the motion object to a position that tracks the moving object. That is, when a motion vector is detected by using at least first and second images that occur successively in time, a motion-blurring-mitigated image of the moving object is combined into a position of a target pixel, which corresponds to this detected motion vector, in one of the images or a position that corresponds to a target pixel in the other image.

Figure 6:
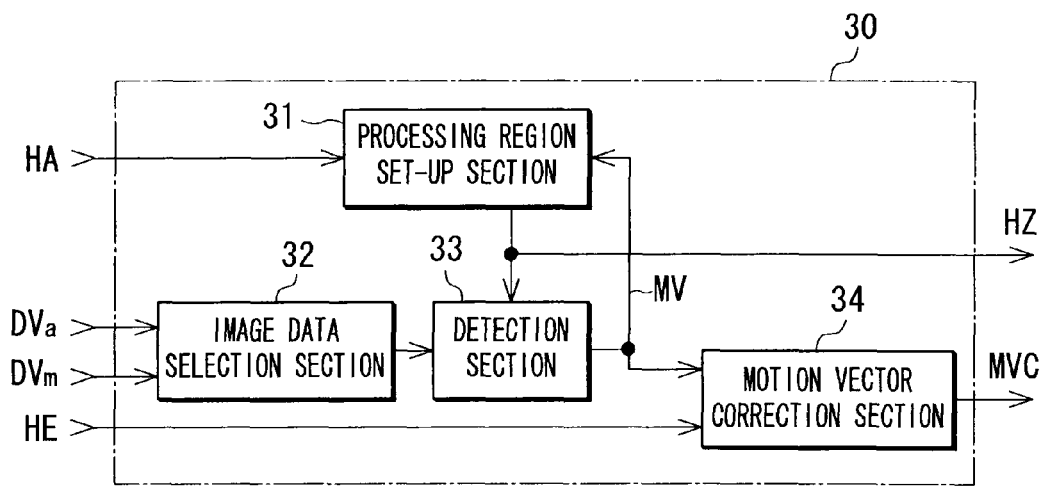
FIG. 6 is a block diagram for showing a configuration of a motion vector detection section.

FIG. 6 is a block diagram for showing a configuration of the motion vector detection section 30. The region selection information HA is supplied to a processing region set-up section 31. Further, the image data DVa and the image data DVm read out of a memory 55 are supplied to an image data detection section 32. Further, the parameter HE for the exposure lapse of time is supplied to a motion vector correction section 34.

The processing region set-up section 31 sequentially extracts processing regions subject to motion-blurring mitigation processing based on the region selection information HA and supplies the detection section 33, the motion-blurring-mitigated image generation section 40 with processing region information HZ that indicates the processing region. Further, it utilizes a motion vector MV detected by the detection section 33, which will be described later, to update the region selection information HA, thereby causing an image region in which motion blurring is mitigated to be tracked in such a manner that it can be met to a movement of a motion object.

The image data selection section 32 supplies the detection section 33 with image data DVa until a motion vector MV can be detected by using the image data DVm read out of the memory 55 and, when the motion vector can be detected by using the image data DVm read out of the memory 55, it supplies the detection section 33 with the image data DVm read out of the memory 55.

The detection section 33 uses, for example, the block matching method, the gradient method, the phase correlation method, the Pel-Recursive algorithm or the like to perform motion vector detection on the processing region indicated by the processing region information HZ and supply the detected motion vector MV to the moving vector correction section 34. Alternatively, the detection section 33 detects a periphery of a tracking point set up in the region indicated by the region selection information HA, for example, region(s) having the same image characteristic quantity as that in the region indicated by the region selection information HA from image data of a plurality of time-directional peripheral frames, thereby calculating the motion vector MV at the tracking point and supplying it to the processing region set-up section 31.

The motion vector MV output by the detection section 33 contains information that corresponds to a movement quantity (norm) and a movement direction (angle). The movement quantity refers to a value that represents a change in position of an image corresponding to the moving object. For example, if the moving object OBf that corresponds to a foreground has moved by as much as move-x horizontally and by as much as move-y vertically in a frame next to a certain frame as reference, its movement quantity can be obtained by Equation 3. Its movement direction can be also obtained by Equation 4. Only one pair of the movement quantity and movement direction is given to a processing region.

$$\text{Movement quantity} = \sqrt{(\text{move-}x)^2 + (\text{move-}y)^2} \quad (3)$$

$$\text{Movement direction} = \tan^{-1}(\text{move-}y/\text{move-}x) \quad (4)$$

The motion vector correction section 34 corrects the motion vector MV using the parameter HE for the exposure lapse of time. The motion vector MV supplied to the motion vector correction section 34 is an inter-frame motion vector as described above. However, a motion vector to be used by the motion-blurring-mitigated image generation section 40, which will be described later, is processed using an intra-frame motion vector, so that if an inter-frame motion vector is used when an exposure lapse of time in one frame is shorter than one frame period because the shutter functions are used, motion-blurring-mitigated processing cannot be performed properly. Therefore, with the motion vector MV, which is an inter-frame motion vector, being corrected in the proportion of the exposure lapse of time to the one frame period of time, it is supplied to the motion-blurring-mitigated image generation section 40 as a motion vector MVC.

Figure 7:
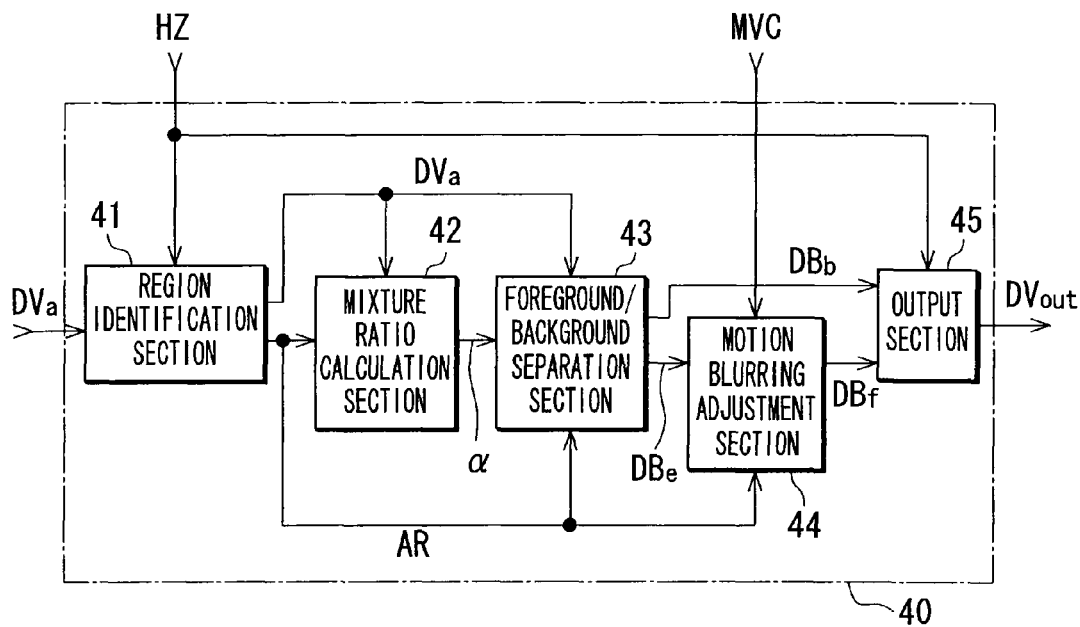
FIG. 7 is a block diagram for showing a configuration of a motion-blurring-mitigated image generation section.

FIG. 7 is a block diagram for showing a configuration of the motion-blurring-mitigated image generation section 40. A region identification section 41 generates information (hereinafter referred to as "region information") AR that indicates which one of a foreground region, a background region, and a mixed region each of the pixels in the processing region indicated by the processing region information HZ in the image displayed on the basis of the image data DVa belongs to and supplies it to a mixture ratio calculation section 42, a foreground/background separation section 43, and a motion blurring adjustment section 44.

The mixture ratio calculation section 42 calculates a mixture ratio α of a background component in the mixed region based on the image data DVa and the region information AR supplied from the region identification section 41 and supplies the calculated mixture ratio α to the foreground/background separation section 43.

The foreground/background separation section 43 separates the image data DVa into foreground component image data DBe comprised of only foreground component and background component image data DBb comprised of only background component based on the region information AR supplied from the region identification section 41 and the mixture ratio α supplied from the mixture ratio calculation section 42 and supplies the foreground component image data DBe to the motion blurring adjustment section 44.

The motion blurring adjustment section 44 decides an adjustment-processing unit indicative of at least one pixel contained in the foreground component image data DBe based on a movement quantity indicated by the motion vector MVC and the region information AR. The adjustment-processing unit is data that specifies one group of pixels subject to motion-blurring mitigation processing.

The motion blurring adjustment section 44 mitigates motion blurring contained in the foreground component image data DBe based on the foreground component image supplied from the foreground/background separation section 43, the motion vector MVC supplied from the motion vector detection section 30 and its region information AR, and the adjustment-processing unit. It supplies this motion-blurring-mitigated foreground component image data DBf to the output section 45.

Figures 8, 10:
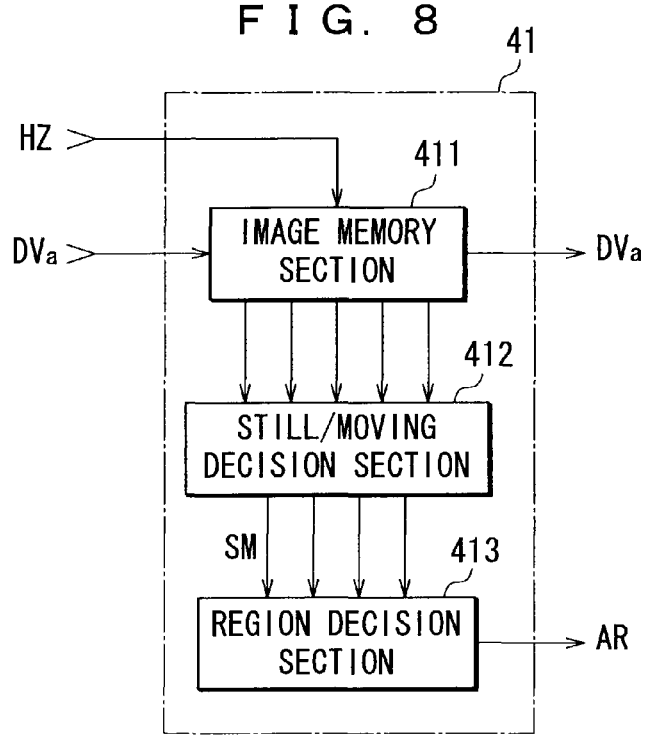
FIG. 8 is a block diagram for showing a configuration of a region identification section.
FIG. 10 is a diagram for showing region decision processing.

FIG. 8 is a block diagram for showing a configuration of the region identification section 41. An image memory 411 stores the input image data DVa in frame units. If frame #n is to be processed, the image memory 411 stores frame #n−2 which occurs two frames, in time, before the frame #n, frame #n−1 which occurs one frame before the frame #n, frame #n, frame #n+1 which occurs one frame after the frame #n, and frame #n+2 which occurs two frame after the frame #n.

A still/moving decision section 412 reads out of the image memory 411 image data of frames #n−2, #n−1, #n+1, and #n+2 in the same region as that specified by the processing region information HZ for frame #n and calculates an inter-frame absolute difference value between items of the read image data. It decides which of a moving portion or a still portion according to whether this inter-frame absolute difference value is higher than a preset threshold value Th and supplies a region decision section 413 with still/moving decision information SM that indicates a result of this decision.

Figure 9:
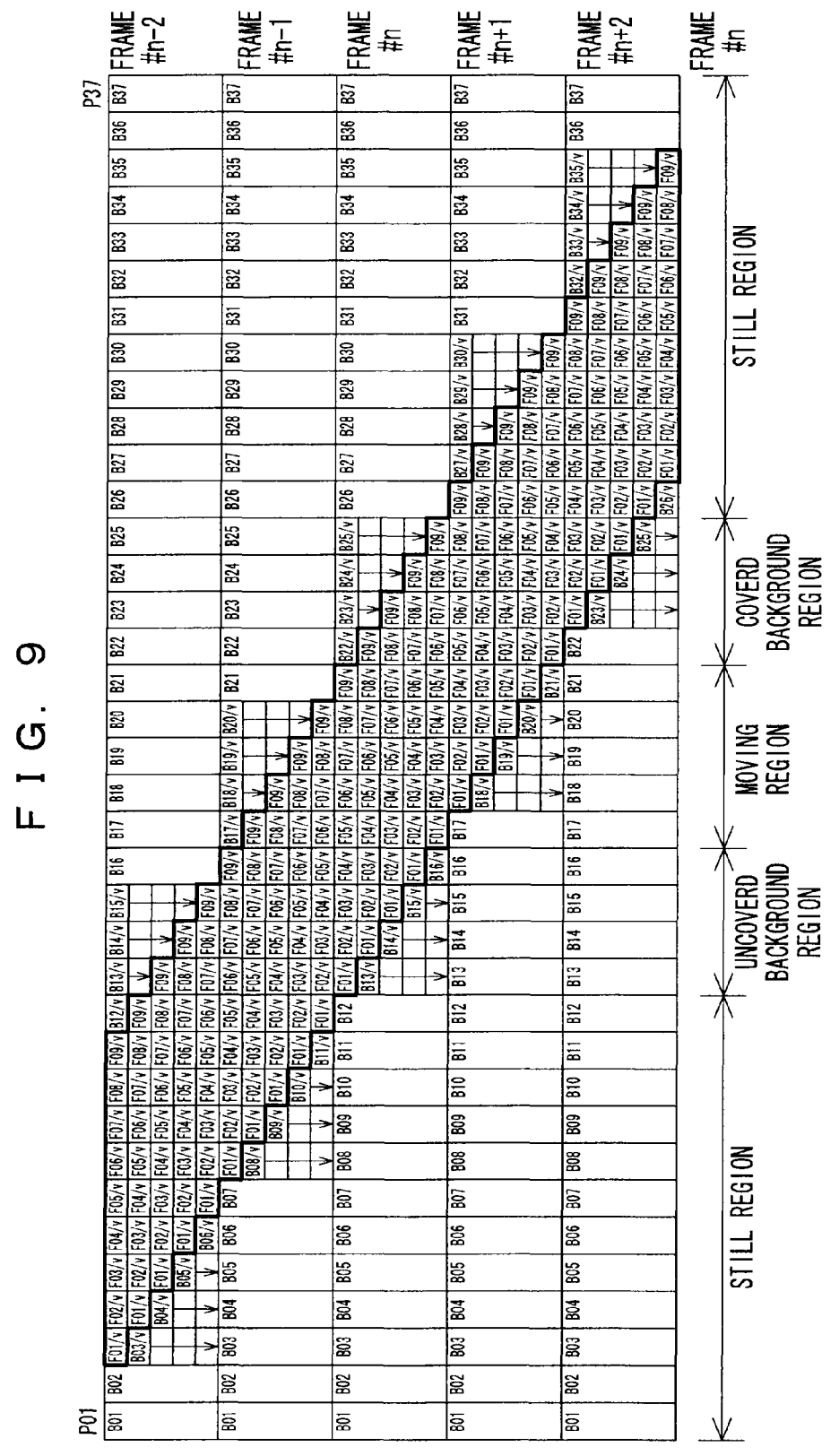

FIG. 9 shows the image data read out of the image memory 411. It is to be noted that FIG. 9 shows a case where image data of pixel locations P01-P37 along one line in a region identified by the processing region information HZ is read.

The still/moving decision section 412 obtains an inter-frame absolute difference value for each of the pixels of two consecutive frames, decides whether the inter-frame absolute difference value is higher than a preset threshold value Th, and decides that it is "moving" if the inter-frame absolute difference value is higher than the threshold value Th or that it is "still", if not higher than the threshold value Th.

The region decision section 413 performs region decision processing shown in FIG. 10, by using a result of decision obtained at the still/moving decision section 412, to decide which one of a still region, a covered background region, an uncovered background region, and a moving region each pixel of a region identified by the processing region information HZ belongs to.

For example, first it decides such a pixel as to have been decided to be still as a result of still/moving decision on frames #n−1 and #n to be of a pixel of the still region. Further, it also decides such a pixel as to have been decided to be still as a result of still/moving decision on frames #n and #n+1 to be of a pixel of the still region.

Next, it decides such a pixel as to have been decided to be still as a result of still/moving decision on frames #n−2 and #n−1 but to be moving as a result of still/moving decision on frames #n−1 and #n to be of a pixel of the covered background region. Further, it decides such a pixel as to have been decided to be moving as a result of still/moving decision on frames #n and #n+1 but to be still as a result of still/moving decision on frames #n+1 and #n+2 to be of a pixel of the uncovered background region.

Then, it decides such a pixel as to have been decided to be moving as a result of both still/moving decision on frames #n−1 and #n and still/moving decision on frames #n and #n+1 to be of a pixel of the moving region.

It is to be noted that there may be some cases where a pixel which exists on the side of a moving region in a covered background region or on the side of the moving region in an uncovered background region is decided to be of the covered background region or the uncovered background region, respectively, even if no background components are contained in it. For example, pixel location P21 in FIG. 9 is decided to be still as a result of still/moving decision on frames #n−2 and #n−1 but to be moving as a result of still/moving decision on frames #n−1 and #n and so may be decided to be of the covered background region even if no background components are contained in it. Another pixel location P17 is decided to be moving as a result of still/moving decision on frames #n and #n+1 but to be still as a result of still/moving decision on frames #n+1 and #n+2 and so may be decided to be of the uncovered background region even if no background components are contained in it. Therefore, correcting each of the pixels on the side of a moving region in a covered background region and each of the pixels on the side of a moving region in an uncovered background region into a pixel of a moving region allows region decision on each pixel to be accurately performed. By thus performing region decision, region information AR that indicates which one of a still region, a covered background region, an uncovered background region, and a moving region each pixel belongs to is generated and supplied to the mixture ratio calculation section 42, the foreground/background separation section 43, and the motion blurring adjustment section 44.

It is to be noted that the region identification section 41 could take a logical sum of region information of an uncovered background region and that of a covered background region to thereby generate region information of a mixed region so that region information AR may indicate which one of the still region, the mixed region, and the moving region each of the pixels belongs to.

Figure 11:
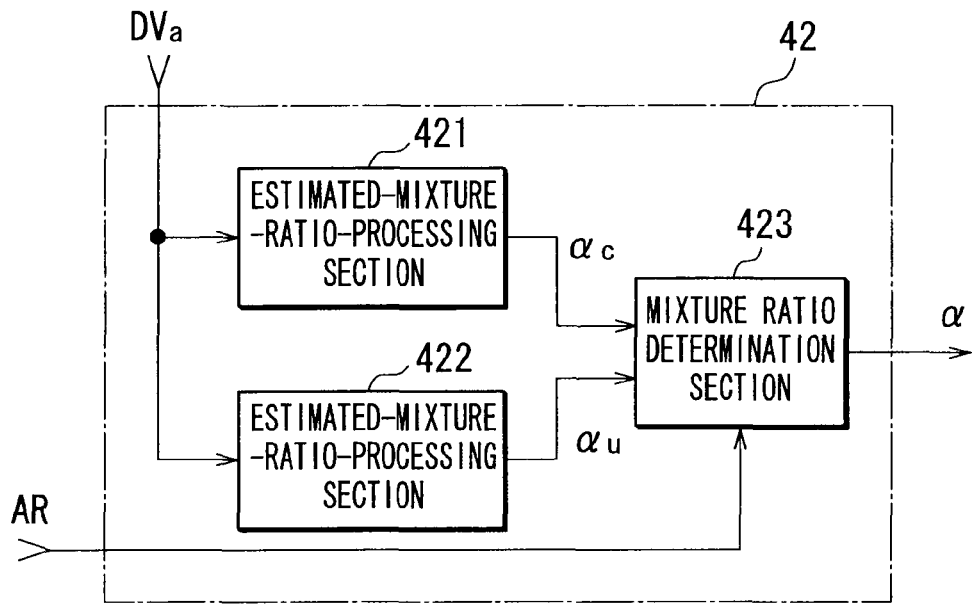
FIG. 11 is a block diagram for showing a configuration of a mixture ratio calculation section.

FIG. 11 is a block diagram for showing a configuration of the mixture ratio calculation section 42. An estimated-mixture-ratio-processing section 421 calculates an estimated mixture ratio αc for each pixel by performing operations for a covered background region based on image data DVa and supplies this calculated estimated mixture ratio αc to a mixture ratio determination section 423. Another estimated-mixture-ratio-processing section 422 calculates an estimated mixture ratio αu for each pixel by performing operations for an uncovered background region based on the image data DVa and supplies this calculated estimated mixture ratio αu to the mixture ratio determination section 423.

The mixture ratio determination section 423 sets a mixture ratio α of background component based on the estimated mixture ratios αc and αu supplied from the estimated-mixture-ratio-processing sections 421, 422, respectively, and the region information AR supplied from the region identification section 41. The mixture ratio determination section 423 sets the mixture ratio α to 0 (α=0) if a target pixel belongs to a moving region. If the target pixel belongs to a still region, on the other hand, it sets the mixture ratio α to 1 (α=1). If the target pixel belongs to a covered background region, it sets the estimated mixture ratio αc supplied from the estimated-mixture-ratio-processing section 421, to the mixture ratio α; and if the target pixel belongs to an uncovered background region, it sets the estimated mixture ratio αu supplied from the estimated-mixture-ratio-processing section 422, to the mixture ratio α. The mixture ratio α thus set is supplied to the foreground/background separation section 43.

Figure 12:
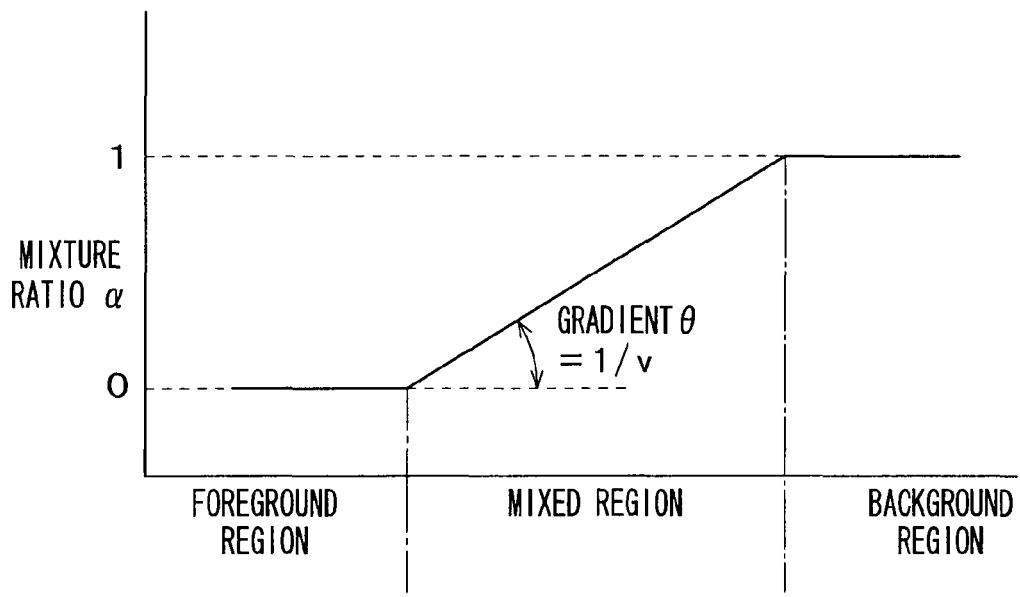
FIG. 12 is a diagram for showing an ideal mixture ratio.

If, here, a frame period is short and so it may be assumed that a moving object that corresponds to a foreground is rigid and moves at the same speed in this frame period, a mixture ratio α of a pixel that belongs to a mixed region changes linearly in accordance with a change in position of the pixel. In such a case, a gradient θ of the ideal mixture ratio α in the mixed region can be expressed as an inverse number of a movement quantity v in a frame period of the moving object that corresponds to the foreground as shown in FIG. 12. That is, the mixture ratio α has a value of "1" in the still (background) region and a value of "0" in the moving (foreground) region and changes in a range of "0" through "1" in the mixed region.

Pixel value DP24 of pixel location P24 in a covered background region shown in FIG. 9 can be given by the following equation 5 on the assumption that a pixel value of pixel location P24 in frame #n−1 is B24:

$$DP24 = 3B24/v + F08/v + F09/v \quad (5)$$

$$= 3/v \cdot B24 + \sum_{i=08}^{09} Fi/v$$

This pixel value DP24 contains background component by 3/v, so that the mixture ratio α when the movement quantity v is "5" (v=5) is 3/5 (α=3/5).

That is, pixel value Dgc of pixel location Pg in the covered background region can be given by the following equation 6. It is to be noted that "Bg" represents a pixel value of pixel location Pg in frame #n−1 and "FEg" represents a sum of foreground components at pixel location Pg.

$$Dgc = \alpha c \cdot Bg + FEg \quad (6)$$

Further, if it is assumed that a pixel value in frame #n+1 at a pixel location having pixel value Dgc is assumed to be Fg and values of Fg/v at this pixel location are all the same as each other, FEg=(1−αc)Fg. That is, Equation 6 can be changed into the following equation 7:

$$Dgc = \alpha c \cdot Bg + (1-\alpha c)Fg \quad (7)$$

This equation 7 can be changed into the following equation 8:

$$\alpha c = (Dgc - Fg)/(Bg - Fg) \quad (8)$$

In Equation 8, Dgc, Bg, and Fg are known, so that the estimated-mixture-ratio-processing section 421 can obtain an estimated mixture ratio αc of a pixel in the covered background region by using pixel values of frames #n−1, #n, and #n+1.

As for uncovered background regions also, like the case of a covered background region, if a pixel value in the uncovered background region is assumed to be DPu, the following equation 9 can be obtained:

$$\alpha u = (Dgu - Bg)/(Fg - Bg) \quad (9)$$

In Equation 9, Dgu, Bg, and Fg are known, so that the estimated-mixture-ratio-processing section 422 can obtain an estimated mixture ratio au of a pixel in the uncovered background region by using pixel values of frames #n−1, #n, and #n+1.

The mixture ratio determination section 423 sets the mixture ratio α to 1 (α=1) if the region information AR indicates a still region and sets the ratio to 0 (α=0) if it indicates a moving region and outputs the ratio. Further, if it indicates a covered background region or an uncovered background region, it outputs as the mixture ratio α an estimated mixture ratio αc calculated by the estimated-mixture-ratio-processing section 421 or an estimated mixture ratio αu calculated by the estimated-mixture-ratio-processing section 422, respectively.

Figure 13:
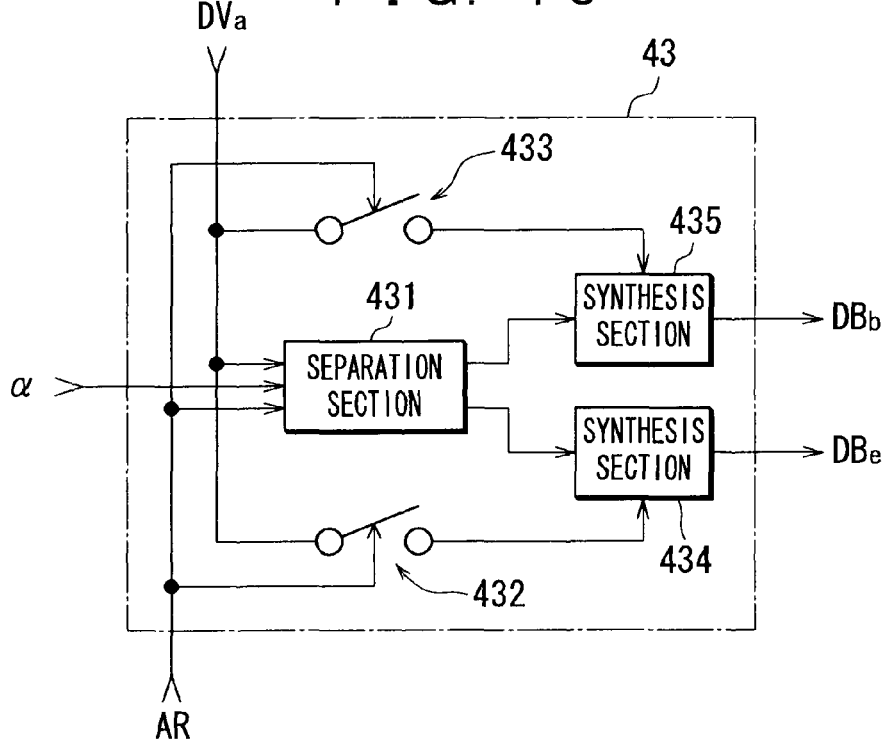
FIG. 13 is a block diagram for showing a configuration of a foreground/background separation section.

FIG. 13 is a block diagram for showing a configuration of the foreground/background separation section 43. The image data DVa supplied to the foreground/background separation section 43 and the region information AR supplied from the region identification section 41 are provided to a separation section 431, a switch section 432, and another switch section 433. The mixture ratio α supplied from the mixture ratio calculation section 42 is supplied to the separation section 431.

Based on the region information AR, the separation section 431 separates from the image data DVa data of pixels in a covered background region and an uncovered background region. Based on this separated data and the mixture ratio α, it separates component of a foreground object that has generated a movement and component of a background at rest from each other, to supply foreground component, which is the component of foreground object, to a synthesis section 434 and the background component to another synthesis section 435.

For example, in frame #n of FIG. 9, pixel locations P22-P25 belong to a covered background region, and if these pixel locations P22-P25 have mixture ratios α22-α25, respectively, pixel value DP22 of pixel location P22 can be given by the following equation 10 on the assumption that a pixel value of pixel location P22 in frame #n−1 is "B22*j*":

$$DP22 = B22/v + F06/v + F07/v + F08/v + F09/v \quad (10)$$
$$= \alpha 22 \cdot B22j + F06/v + F07/v + F08/v + F09/v$$

Foreground component FE22 of pixel location P22 in this frame #n can be given by the following equation 11:

$$FE22 = F06/v + F07/v + F08/v + F09/v \quad (11)$$
$$= DP22 - \alpha 22 \cdot B22j$$

That is, foreground component FEgc of the pixel location Pg in a covered background region in frame #n can be obtained using the following equation 12 if a pixel value of pixel location Pg in frame #n−1 is assumed to be "Bgj":

$$FEgc = DPg - \alpha c \cdot Bgj \quad (12)$$

Further, foreground component FEgu in an uncovered background region can also be obtained as in the case of foreground component FEgc in the covered background region.

For example, in frame #n, pixel value DP16 of pixel location P16 in an uncovered background region is given by the following equation 13 if a pixel value of the pixel location P16 in frame #n+1 is assumed to be "B16*k*":

$$DP16 = B16/v + F01/v + F02/v + F03/v + F04/v \quad (13)$$
$$= \alpha 16 \cdot B16k + F01/v + F02/v + F03/v + F04/v$$

Foreground component FE16 of the pixel location P16 in this frame #n can be given by the following equation 14:

$$FE16 = F01/v + F02/v + F03/v + F04/v \quad (14)$$
$$= DP16 - \alpha 16 \cdot B16k$$

That is, the foreground component FEgu of pixel location Pgu in an uncovered background region in frame #n can be obtained by using the following equation 15 if a pixel value of pixel location Pg in frame #n+1 is assumed to be "Bgk":

$$FEgu = DPg - \alpha u \cdot Bk \quad (15)$$

The separation section 431 can thus separate the foreground component and the background component from each other by using the image data DVa, region information AR generated by the region identification section 41, and the mixture ratio α calculated by the mixture ratio calculation section.

The switch section 432 conducts switch control based on the region information AR to thereby select data of a pixel in a moving region from the image data DVa and supply it to the synthesis section 434. The switch section 433 conducts switch control based on the region information AR to thereby select data of a pixel in a still region from the image data DVa and supply it to the synthesis section 435.

The synthesis section 434 synthesizes the foreground component image data DBe by using the component of the foreground object supplied from the separation section 431 and the data of the moving region supplied from the switch section 432 and supplies it to the motion blurring adjustment section 44. Further, in initialization which is performed first in processing to generate the foreground component image data DBe, the synthesis section 434 stores, in a built-in frame memory, initial data whose pixel values are all 0 and overwrites image data on this initial data. Therefore, a portion that corresponds to the background region will be a state of the initial data.

The synthesis section 435 synthesizes the background component image data DBb by using the background component supplied from the separation section 431 and the data of the still region supplied from the switch section 433 and supplies it to the output section 45. Further, in initialization which is performed first in processing to generate the background component image data DBb, the synthesis section 435 stores, in the built-in frame memory, an image whose pixel values are all 0 and overwrites image data on this initial data. Therefore, a portion that corresponds to the foreground region will be a state of the initial data.

Figure 14:
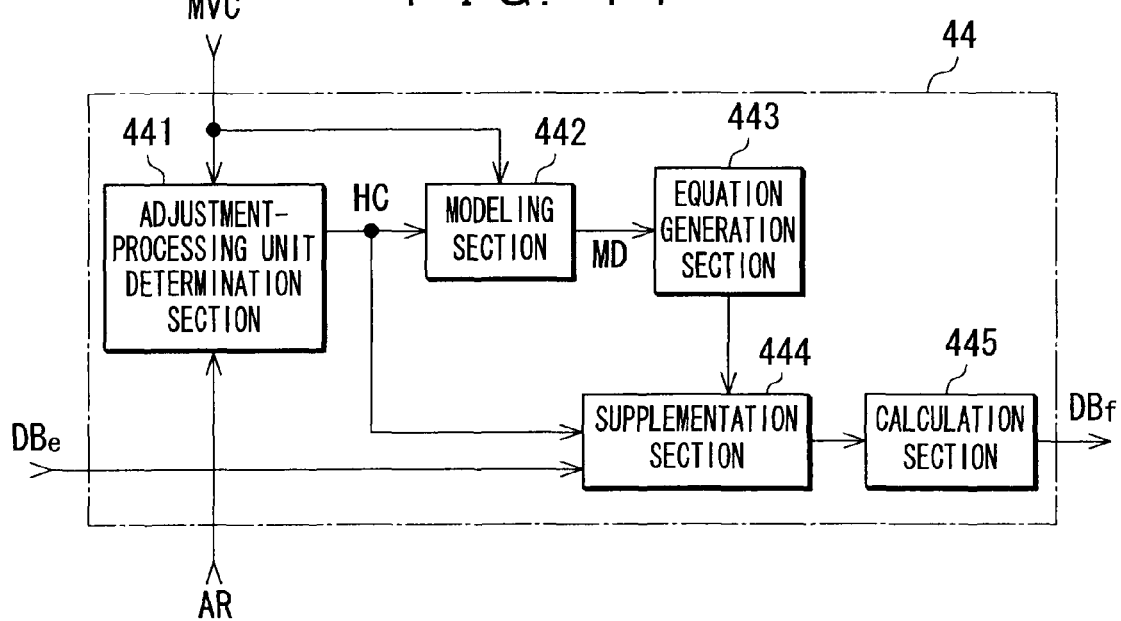
FIG. 14 is a block diagram for showing a configuration of a motion blurring adjustment section.

FIG. 14 is a block diagram for showing a configuration of the motion blurring adjustment section 44. The motion vector MVC supplied from the motion vector detection section 30 is provided to an adjustment-processing unit determination section 441 and a modeling section 442. The region information AR supplied from the region identification section 41 is supplied to the adjustment-processing unit determination section 441. The foreground component image data DBe supplied from the foreground/background separation section 43 is supplied to a supplementation section 444.

The adjustment-processing unit determination section 441 sets up, as an adjustment-processing unit, consecutive pixels that are lined up in a movement direction from the covered background region toward the uncovered background region in the foreground component image, based on the region information AR and the motion vector MVC. Alternatively, it sets up, as an adjustment-processing unit, consecutive pixels that are lined up in a movement direction from the uncovered background region toward the covered background region. It supplies adjustment processing unit information HC indicative of the set adjustment-processing unit, to the modeling section 442 and the supplementation section 444. FIG. 15 shows adjustment processing units in a case where, for example, pixel locations P13-P25 in frame #n of FIG. 9 are each set up as an adjustment-processing unit. It is to be noted that if the movement direction is different from a horizontal or vertical direction, the movement direction can be changed to a horizontal or vertical direction by performing affine transformation in the adjustment-processing unit determination section 441, to perform processing in the same way as in the case where it is horizontal or vertical one.

The modeling section 442 performs modeling based on the motion vector MVC and the set adjustment processing unit information HC. In this modeling, a plurality of models that corresponds to the number of pixels contained in an adjustment-processing unit, a time-directional virtual division number of the image data DVa, and the number of pixel-specific foreground components could be stored beforehand so that a model MD to specify a correlation between the image data DVa and the foreground components may be selected on the basis of the adjustment-processing unit and the time-directional virtual division number of pixel values.

The modeling section 442 supplies the selected model MD to an equation generation section 443. The equation generation section 443 generates an equation based on the model MD supplied from the modeling section 442. Assuming that the adjustment-processing unit is, as described above, pixel locations P13-P25 in frame #n, the movement quantity v is "five pixels", and the virtual division number is "five", foreground component FE01 at pixel location C01 and foreground components FE02-FE13 at the respective pixel locations C02-C13 within the adjustment-processing unit can be given by the following equations 16-28:

$$FE01 = F01/v \tag{16}$$

$$FE02 = F02/v + F01/v \tag{17}$$

$$FE03 = F03/v + F02/v + F01/v \tag{18}$$

$$FE04 = F04/v + F03/v + F02/v + F01/v \tag{19}$$

$$FE05 = F05/v + F04/v + F03/v + F02/v + F01/v \tag{20}$$

$$FE06 = F06/v + F05/v + F04/v + F03/v + F02/v \tag{21}$$

$$FE07 = F07/v + F06/v + F05/v + F04/v + F03/v \tag{22}$$

$$FE08 = F08/v + F07/v + F06/v + F05/v + F04/v \tag{23}$$

$$FE09 = F09/v + F08/v + F07/v + F06/v + F05/v \tag{24}$$

$$FE10 = F09/v + F08/v + F07/v + F06/v \tag{25}$$

$$FE11 = F09/v + F08/v + F07/v \tag{26}$$

$$FE12 = F09/v + F08/v \tag{27}$$

$$FE13 = F09/v \tag{28}$$

The equation generation section 443 changes the generated equations to generate new equations. The following equations 29-41 are generated by the equation generation section 443:

$$FE01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v + 0 \cdot F09/v \tag{29}$$

$$FE02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v + 0 \cdot F09/v \tag{30}$$

$$FE03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v + 0 \cdot F09/v \tag{31}$$

$$FE04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v + 0 \cdot F09/v \tag{32}$$

$$FE05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v + 0 \cdot F09/v \tag{33}$$

$$FE06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v + 0 \cdot F09/v \tag{34}$$

$$FE07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v + 0 \cdot F09/v \tag{35}$$

$$FE08 = 0 \cdot F01/v + 0 \cdot F02/v + 0 \cdot F03/v + 1 \cdot F04/v + 1 \cdot F05/v + 1 \cdot F06/v + 1 \cdot F07/v + 1 \cdot F08/v + 0 \cdot F09/v \tag{36}$$

$$FE09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v + 1 \cdot F09/v \tag{37}$$

$$FE10 = 0 \cdot F01/v + 1 \cdot F02/v + 0 \cdot F03/v + 0 \cdot F04/v + 0 \cdot F05/v + 1 \cdot F06/v + 1 \cdot F07/v + 1 \cdot F08/v + 1 \cdot F09/v \tag{38}$$

$$FE11 = 0 \cdot F01/v + 0 \cdot F02/v + 0 \cdot F03/v + 0 \cdot F04/v + 0 \cdot F05/v + 0 \cdot F06/v + 1 \cdot F07/v + 1 \cdot F08/v + 1 \cdot F09/v \tag{39}$$

$$FE12 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v + 1 \cdot F09/v \tag{40}$$

$$FE13 = 0 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v + 1 \cdot F09/v \tag{41}$$

These equations 29-41 can be expressed also in the following equation 42:

$$FEj = \sum_{i=01}^{09} aij \cdot Fi/v \tag{42}$$

In Equation 42, "j" indicates a pixel location in an adjustment-processing unit. In this example, j takes on any one of values 1-13. Further, "i" indicates a position of a foreground component. In this example, i takes on any one of values 1-9. aij takes on either one of values 0 and 1 in accordance with values of i and j.

Taking into account an error, Equation 42 can be expressed as the following equation 43:

$$FEj = \sum_{i=01}^{09} aij \cdot Fi/v + ej \tag{43}$$

In Equation 43, ej indicates an error contained in a target pixel Cj. This equation 43 can be rewritten into the following equation 44:

$$ej = FEj - \sum_{i=01}^{09} aij \cdot Fi/v \tag{44}$$

To apply the least-squares method, a sum E of squares of the errors is defined as given in the following equation 45:

$$E = \sum_{j=01}^{13} ej^2 \tag{45}$$

To reduce errors to a minimum, a partial differential value due to a variable Fk for the sum E of squares of errors can be made 0, so that Fk is obtained so as to satisfy the following equation 46:

$$\frac{\partial E}{\partial Fk} = 2 \cdot \sum_{j=01}^{13} ej \cdot \left( \frac{\partial ej}{\partial Fk} \right)$$

$$= 2 \cdot \sum_{j=01}^{13} \left( \left( FEj - \sum_{i=01}^{09} aij \cdot Fi/v \right) \cdot (-akj/v) \right) = 0 \tag{46}$$

In Equation 46, a movement quantity v is fixed, so that the following equation 47 can be derived:

$$\sum_{j=01}^{13} akj \cdot \left( FEj - \sum_{i=01}^{09} aij \cdot Fi/v \right) = 0 \quad (47)$$

Equation 47 can be expanded and transposed to provide the following equation 48:

$$\sum_{j=01}^{13} \left( akj \cdot \sum_{i=01}^{09} aij \cdot Fi \right) = v \cdot \sum_{j=01}^{13} akj \cdot FEj \quad (48)$$

This equation 48 is expanded into nine equations by substituting any one of integers 1-9 into k in it. These obtained nine equations can in turn be expressed as one equation by using a matrix. This equation is referred to as a normal equation.

An example of such a normal equation generated by the equation generation section 443 based on the least-squares method is given in the following equation 49:

$$\begin{bmatrix} 5 & 4 & 3 & 2 & 1 & 0 & 0 & 0 & 0 \\ 4 & 5 & 4 & 3 & 2 & 1 & 0 & 0 & 0 \\ 3 & 4 & 5 & 4 & 3 & 2 & 1 & 0 & 0 \\ 2 & 3 & 4 & 5 & 4 & 3 & 2 & 1 & 0 \\ 1 & 2 & 3 & 4 & 5 & 4 & 3 & 2 & 1 \\ 0 & 1 & 2 & 3 & 4 & 5 & 4 & 3 & 2 \\ 0 & 0 & 1 & 2 & 3 & 4 & 5 & 4 & 3 \\ 0 & 0 & 0 & 1 & 2 & 3 & 4 & 5 & 4 \\ 0 & 0 & 0 & 0 & 1 & 2 & 3 & 4 & 5 \end{bmatrix} \cdot \begin{bmatrix} F01 \\ F02 \\ F03 \\ F04 \\ F05 \\ F06 \\ F07 \\ F08 \\ F09 \end{bmatrix} = v \cdot \begin{bmatrix} \sum_{i=01}^{05} FEi \\ \sum_{i=02}^{06} FEi \\ \sum_{i=03}^{07} FEi \\ \sum_{i=04}^{08} FEi \\ \sum_{i=05}^{09} FEi \\ \sum_{i=06}^{10} FEi \\ \sum_{i=07}^{11} FEi \\ \sum_{i=08}^{12} FEi \\ \sum_{i=09}^{13} FEi \end{bmatrix} \quad (49)$$

If this equation 49 is expressed as $A \cdot F = v \cdot FE$, A and v are known at a point in time of modeling. Further, FE can be known by inputting a pixel value in supplementation, leaving F unknown.

It is thus possible to calculate the foreground component F by using the normal equation that is based on the least-squares method, thereby dispersing errors contained in the pixel value FE. The equation generation section 443 supplies the thus generated normal equation to the supplementation section 444.

The supplementation section 444 sets foreground component image data DBe into a matrix supplied from the equation generation section 443, based on the adjustment processing unit information HC supplied from the adjustment-processing unit determination section 441. Furthermore, the supplementation section 444 supplies a calculation section 445 with the matrix in which image data is set.

Figure 16:
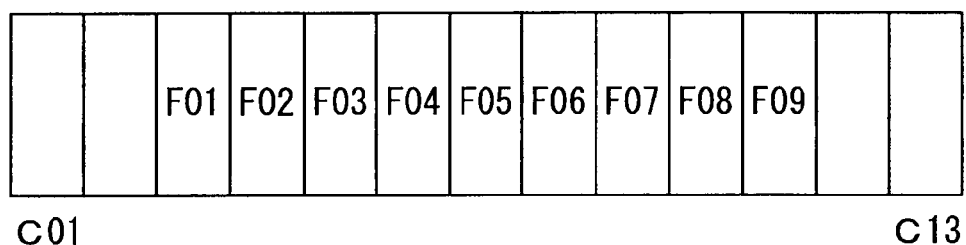
FIG. 16 is a diagram for showing a position of a pixel value in which motion blurring is mitigated.

The calculation section 445 calculates foreground component Fi/V in which motion blurring is mitigated by performing processing based on a solution such as the sweeping-out method (Gauss-Jordan elimination), to generate pixel values F01-F09 of the foreground in which motion blurring is mitigated. These pixel values F01-F09 thus generated are supplied to the output section 45 at, for example, half a phase of one frame period by setting image positions of the pixel values F01-F09 by using a center of the adjustment-processing unit as a reference so that the foreground component image position may not be changed. That is, as shown in FIG. 16, with pixel values F01-F09 as the respective items of the image data of pixel locations CO3-011, image data DVafc of the foreground component image in which motion blurring is mitigated, is supplied to the output section 45 at a timing of ½ of one frame period.

It is to be noted that if an even number of pixel values is given, for example, when pixel values F01-F08 are obtained, the calculation section 445 outputs either one of central two pixel values F04 and F05 as the center of the adjustment-processing unit. Further, if an exposure lapse of time in one frame is shorter than one frame period because a shutter operation is performed, it is supplied to the output section 45 at half a phase of the exposure lapse of time.

The output section 45 combines the foreground component image data DBf supplied from the motion blurring adjustment section 44 into the background component image data DBb supplied from the foreground/background separation section 43, to generate image data DVout and output it. The image data DVout thus generated is supplied to the memory 55. In this case, the foreground component image in which motion blurring is mitigated is combined into a space-time position that corresponds to the motion vector MVC detected by the motion vector detection section 30. That is, combining the motion-blurring-mitigated foreground component image into a position indicated by the processing region information HZ that is set in accordance with the motion vector MVC allows the motion-blurring-mitigated foreground component image to output with it being properly set to an image position before the motion blurring adjustment.

The memory 55 stores image data DVout of the motion-blurring-mitigated image supplied from the output section 45. Image data stored in it is supplied to the motion vector detection section 30 as the image data DVm.

Thus, by generating a motion-blurring-mitigated image in which motion blurring of a moving object in an image is mitigated and detecting a motion vector by using this motion-blurring-mitigated image, it is possible to accurately detect the motion vector of the moving object by reducing an influence due to this motion blurring, if any, in an image that is based on the image data DVa supplied from the image sensor 10.

Further, in a processing region in an image, modeling can be performed on the assumption that in the processing region in the image, a pixel value of each pixel in which no motion blurring that corresponds to an moving object occur is integrated in a time direction as it moves in accordance with the motion vector, to extract as significant information a mixture ratio between foreground object component and background object component, thereby separating component of the moving object by utilizing the significant information to accurately mitigate the motion blurring based on this separated component of the moving object.

Furthermore, since an image of a moving object in which motion blurring is mitigated is output to a position of the target pixel or a position that corresponds to the target pixel based on a motion vector, the image of the moving object can be output to a proper position.

Figure 17:
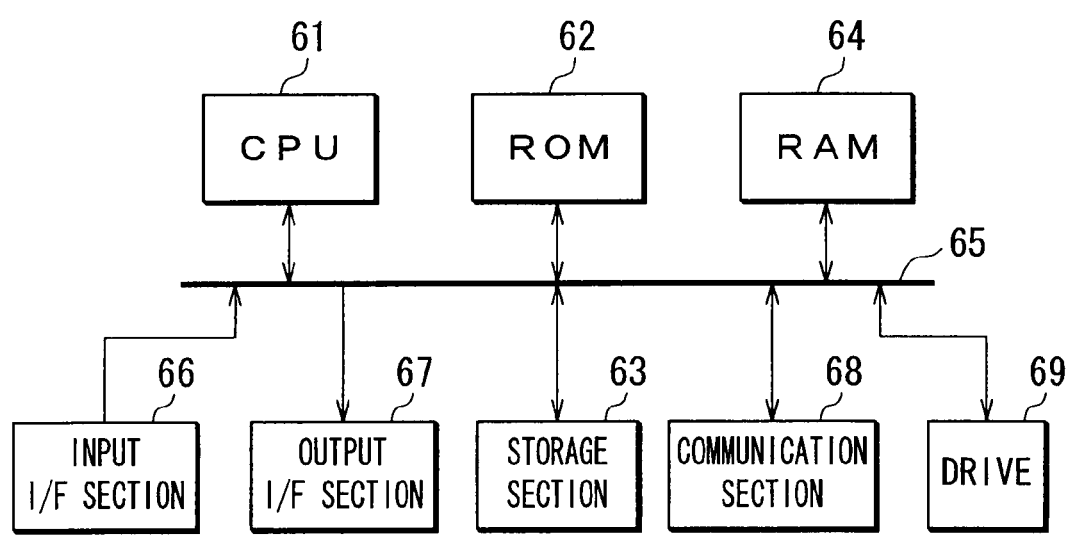
FIG. 17 is a diagram for showing another configuration of the apparatus for processing the image.

Meanwhile, motion blurring can be mitigated also by using software. FIG. 17 shows a case where the motion blurring is mitigated by using software, as another configuration of the apparatus for processing the image. A central processing unit (CPU) 61 performs a variety of kinds of processing according to a program stored in a read only memory (ROM) 62 or a storage section 63. This storage section 63 is made up of, for example, a hard disk, to store a program to be executed by the CPU 61 and a variety of kinds of data. A random access memory (RAM) 64 appropriately stores data etc. to be used when programs to be executed by the CPU 61 or various kinds of data are processed. These CPU 61, ROM 62, storage section 63, and RAM 64 are connected to each other through a bus 65.

To the CPU 61, an input interface section 66, an output interface section 67, a communication section 68, and a drive 69 are connected via the bus 65. To the input interface 66, an input device such as a keyboard, a pointing device (e.g., mouse), or a microphone is connected. To the output interface section 67, on the other hand, an output device such as a display or a speaker is connected. The CPU 61 performs a variety of kinds of processing according to a command input through the input interface section 66. Then, the CPU 61 outputs an image, a voice, etc. obtained as a result of the processing, through the output interface section 67. The communication section 68 communicates with an external device via the Internet or any other network. This communication section 68 is used to take in image data DVa output from the image sensor 10, acquire a program, etc. The drive 69, when a magnetic disk, an optical disc, a magneto optical disk, or a semiconductor memory is mounted in it, drives it to acquire a program or data recorded on or in it. The acquired program or data is, as necessary, transferred to the storage section 63 to be stored in it.

Figure 18:
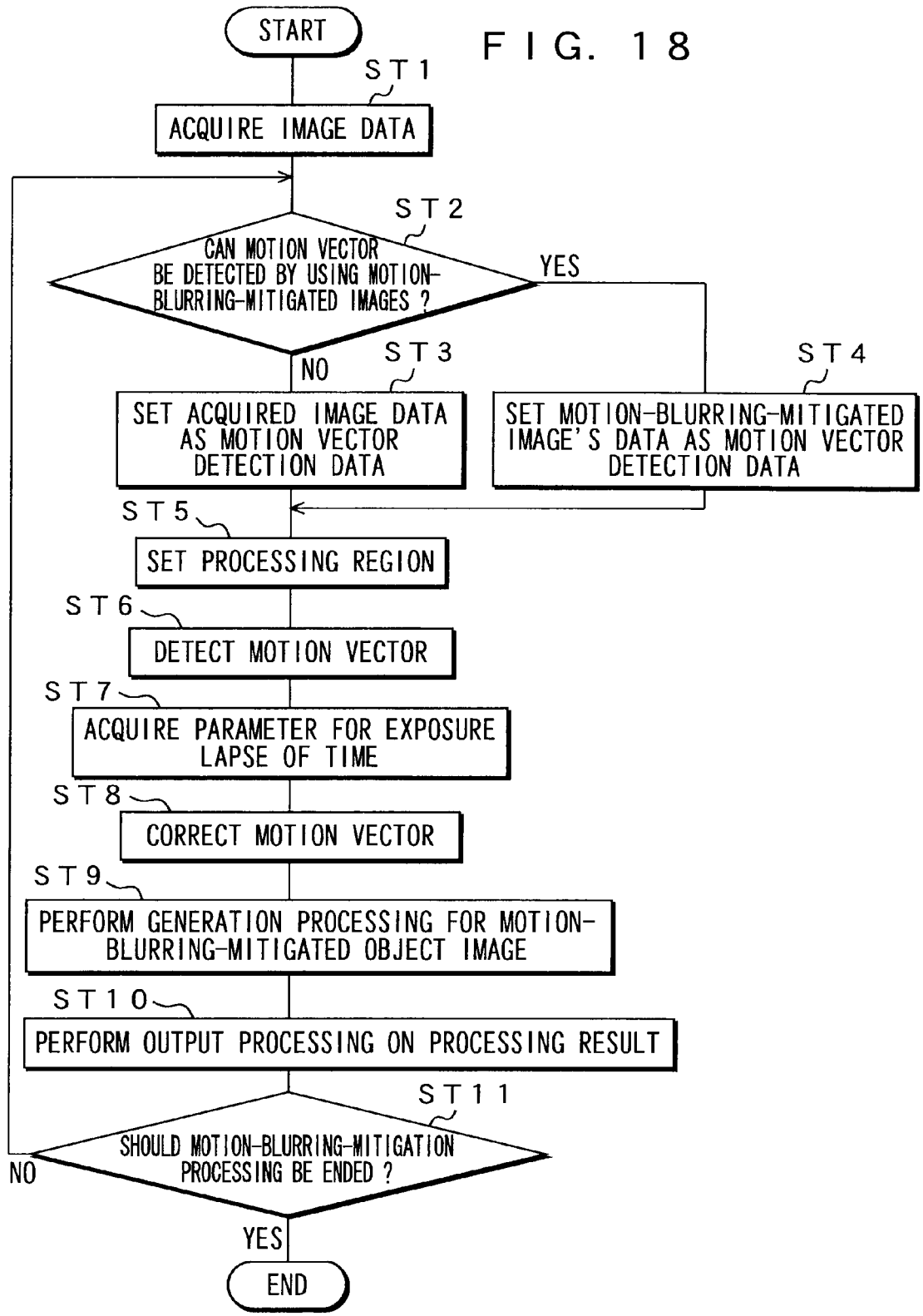
FIG. 18 is a flowchart for showing operations for showing the apparatus for processing the image.

The following will describe operations of the apparatus for processing the image with reference to a flowchart of FIG. 18. At step ST1, the CPU 61 acquires image data DVa generated by the image sensor 10 through the input section, the communication section or the like and allows the storage section 63 to store this acquired image data DVa therein.

At step ST2, the CPU 61 decides whether it is possible to detect a motion vector by using a motion-blurring-mitigated mage. If image data of the motion-blurring-mitigated image is not stored in the storage section 63 or the RAM 64 by as much as such a number of frames as to be required to detect the motion vector and, therefore, the motion vector cannot be detected by using the image data of the motion-blurring-mitigated image, the process goes to step ST3. If the image data of the motion-blurring-mitigated image is stored by as much as such a number of frames as to be required to detect the motion vector and, therefore, the motion vector can be detected by using this stored image data, the process goes to step ST4.

At step ST3, the CPU 61 sets the image data DVa acquired at step ST1 as motion vector detection data and the process goes to step ST5. At step ST4, on the other hand, the CPU 61 sets image data DVm of the stored motion-blurring-mitigated image as motion vector detection data and the process goes to step ST5.

At step ST5, the CPU 61 sets a processing region under instruction from outside.

At step ST6, the CPU 61 detects a motion vector of moving object OBf that corresponds to a foreground in the processing region determined in the step ST5 by using the motion vector detection data.

At step ST7, the CPU 61 acquires parameters for exposure lapse of time and the process goes to step ST8 where the motion vector detected at step ST6 is corrected in accordance with the parameter for exposure lapse of time, and then the process goes to step ST9.

Figure 19:
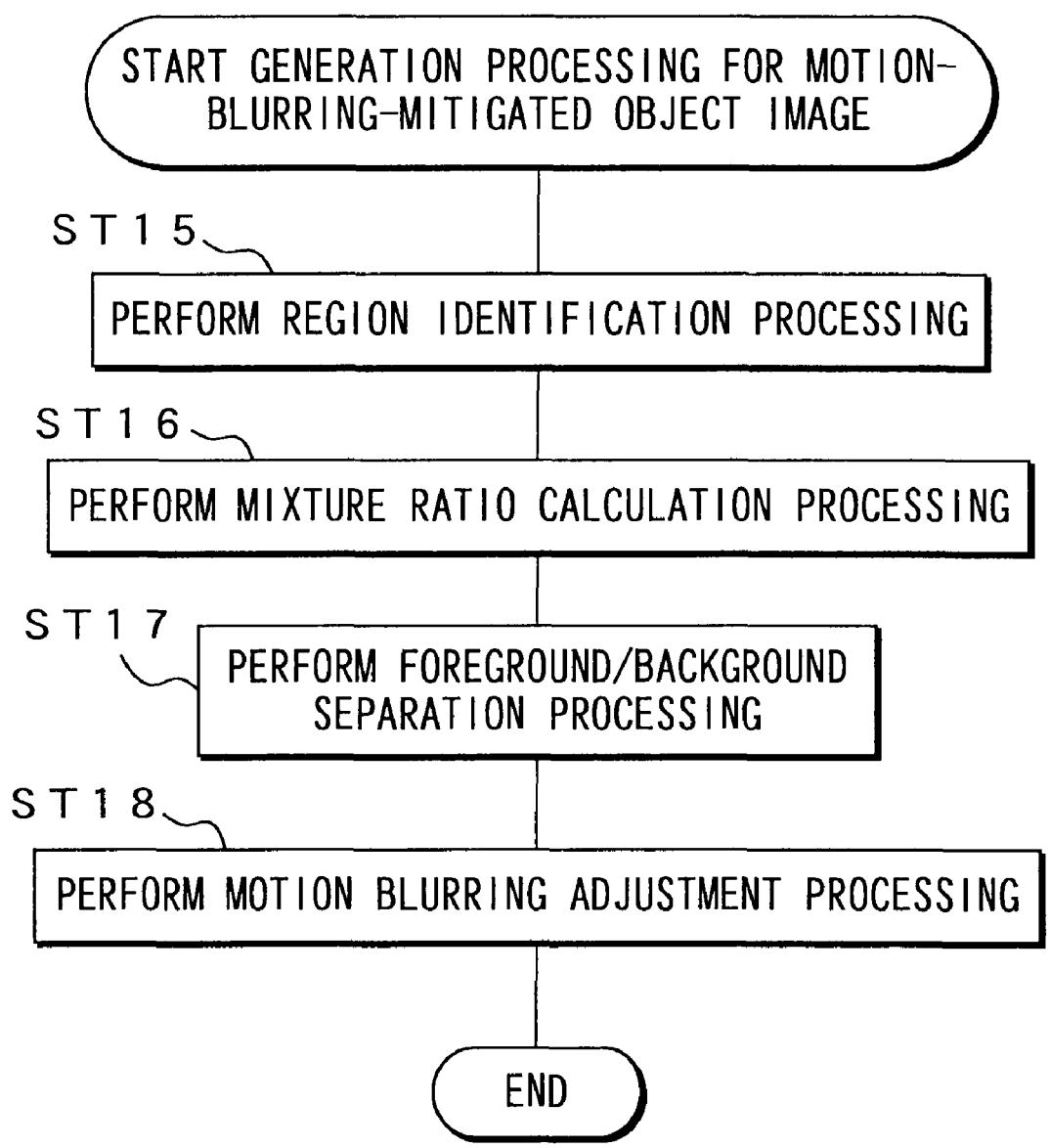
FIG. 19 is a flowchart for showing generation processing of the motion-blurring-mitigated image.

At step ST9, the CPU 61 performs generation processing for a motion-blurring-mitigated object image in order to mitigate motion blurring in the moving object OBf, based on the corrected motion vector, and generates image data in which motion blurring in the moving object OBf is mitigated. FIG. 19 is a flowchart for showing the generation processing for the motion-blurring-mitigated object image.

At step ST15, the CPU 61 performs region identification processing on the processing region determined at step ST5, to decide which one of a background region, a foreground region, a covered background region, and an uncovered background region a pixel in the determined processing region belongs to, thereby generating region information. In this generation of the region information, if frame #n is subject to the processing, image data of frames #n−2, #n−1, #n, #n+1, and #n+2 is used to calculate an inter-frame absolute difference value thereof. According to whether this inter-frame absolute difference value is larger than a preset threshold value Th, it decides whether it is included in a moving portion or a still portion and performs region decision based on a result of the decision, thereby generating the region information.

At step ST16, the CPU 61 performs mixture ratio calculation processing to calculate on each pixel in the processing region a mixture ratio α indicative of a ratio at which background components are contained by using the region information generated at step ST15, and the process goes to step ST17. In this calculation of the mixture ratio α, for a pixel in the covered background region or the uncovered background region, pixel values of frames #n−1, #n, and #n+1 are used to obtain an estimated mixture ratio ac. Further, the mixture ratio α is set to "1" for the background region and to "0" for the foreground region.

At step ST17, the CPU 61 performs foreground/background separation processing to separate image data in the processing region into foreground component image data comprised of only foreground component and background component image data comprised of only background component, based on the region information generated at step ST15 and the mixture ratio α calculated at step ST16. That is, it obtains the foreground component by performing an operation of the above-described equation 12 for a covered background region in frame #n and an operation of the above-described equation 15 for an uncovered background region in it, to separate image data into foreground component image data and background component image data comprised of only background component.

At step ST18, the CPU 61 performs motion blurring adjustment processing to determine an adjustment-processing unit indicative of at least one pixel contained in the foreground component image data based on the post-correction motion vector obtained at step ST8 and the region information generated at step ST15, thereby mitigating motion blurring contained in the foreground component image data separated by step ST17. That is, it sets an adjustment-processing unit based on the motion vector MVC, the processing region information HZ, and the region information AR and, based on this motion vector MVC and the set adjustment-processing unit, performs modeling to generate a normal equation. It sets image data to this generated normal equation and performs processing thereon in accordance with the sweeping-out method (Gauss-Jordan elimination), to generate image data of the motion-blurring-mitigated object image, that is, foreground component image data in which motion blurring is mitigated.

At step ST10, the CPU61 performs output processing on a result of the processing to combine the motion-blurring-mitigated foreground component image data generated at step ST18 into a space-time position that corresponds to the motion vector obtained at step ST8 on an image due to the background component image data separated at step ST17, to generate and output image data DVout of the motion-blurring-mitigated image, which is a result of the processing.

At step ST11, the CPU61 decides whether the motion-blurring-mitigation processing should be ended. If, in this case, the motion-blurring-mitigation processing is to be performed on an image of the next frame, the process returns to step ST2 and, if the motion-blurring-mitigation processing is not performed, the processing ends. It is thus possible to perform the motion blurring mitigation processing also by using software.

Although the above embodiment has obtained a motion vector of an object whose motion blurring is to be mitigated and separated the processing region containing the object whose motion blurring is to be mitigated into a still region, a moving region, a mixed region, etc. to perform the motion-blurring-mitigation processing by using image data of the moving region and the mixed region, it is possible to mitigate motion blurring without identifying foreground, background, and mixed regions, by performing the motion-blurring-mitigation processing by obtaining a motion vector for each pixel.

In this case, the motion vector detection section 30 obtains the motion vector of the target pixel and supplies it to the motion-blurring-mitigated image generation section 40. Further, it supplies the output section with processing region information HD that indicates a pixel location of the target pixel.

Figure 20:
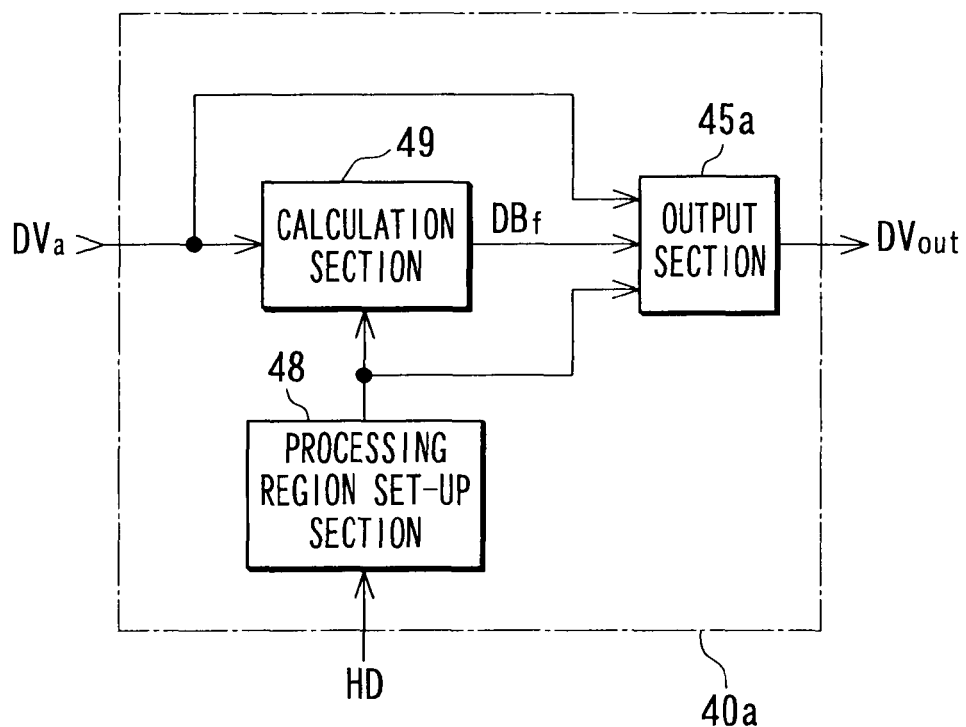
FIG. 20 is a block diagram for showing another configuration of a motion-blurring-mitigated image generation section.
Figure 21:
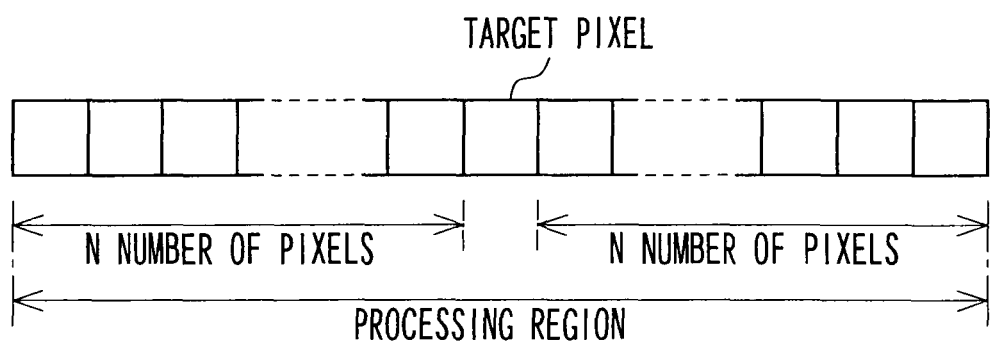
FIG. 21 is a diagram for showing a processing region.

FIG. 20 shows a configuration of a motion-blurring-mitigated image generation section that can mitigate motion blurring without identifying foreground, background, and mixed regions. A processing region set-up section 48 in the moving-blurring-mitigated image generation section 40a sets up a processing region for a target pixel on an image whose motion blurring is to be mitigated in such a mariner that this processing region may be aligned with a movement direction of a motion vector for this target pixel and then notifies a calculation section 49 of it. Further, it supplies a position of the target pixel to an output section 45a. FIG. 21 shows a processing region which is set up so as to have (2N+1) number of pixels in the movement direction around the target pixel as a center. FIG. 22 show examples of setting up a processing region; if a motion vector runs, for example, horizontal as shown by an arrow B with respect to pixels of a moving object OBf whose motion blurring is to be mitigated, a processing region WA is set up horizontally as shown in FIG. 22A. If the motion vector runs obliquely, on the other hand, the processing region WA is set up in a relevant angle direction as shown in FIG. 22B. However, to set up a processing region obliquely, a pixel value that corresponds to a pixel location of the processing region must be obtained by interpolation etc.

In this case, in the processing region, as shown in FIG. 23, actual world variables ($Y_{-8}, \ldots, Y_0, \ldots, Y_8$) are mixed time-wise. It is to be noted that FIG. 23 shows a case where a movement quantity v is set to 5 (v=5) and the processing region comprises 13 pixels (N=6, where N is the number of pixels of a processing width for the target pixel).

The calculation section 49 performs actual world estimation on this processing region, to output only center pixel variable $Y_0$ of an estimated actual world as a pixel value of the target pixel whose motion blurring has been removed.

Assuming here that pixel values of pixels in the processing region are $X_{-N}, X_{-N+1}, \ldots, X_0, \ldots, X_{N-1}, X_N$, (2N+1) number of mixed equations such as shown in Equation 50 are established. In this equation, a constant h indicates a value (whose decimal places are truncated) of an integer part obtained by multiplying the movement quantity by (½).

$$\sum_{i=t-h}^{t+h} (Yi/v) = Xt \ (t = -N, \ldots, 0, \ldots, N) \quad (50)$$

However, there are (2N+v) number of actual world variables ($Y_{-N-h}, Y_O, Y_{N+h}$) to be obtained. That is, numbers of the equations is less than those of the variables, so that it is impossible to obtain the actual world variables ($Y_{-N-h}, Y_0$, and $Y_{N+h}$) according to Equation 50.

Consequently, by increasing the numbers of the equations over the numbers of the actual world variables by using the following equation 51, which is a restriction equation that employs space correlations, values of the actual world variables are obtained using the least-squares method.

$$Y_t - Y_{t+1} = 0$$

$$(t=-N-h, \ldots, 0, \ldots, N+h-1) \quad (51)$$

That is, the (2N+v) number of actual world variables ($Y_{-N-h}, \ldots, Y_O, \ldots, Y_{N+h}$), which are unknown, are obtained by using a total (4N+v) number of equations obtained by adding up (2n+1) number of mixed equations represented by Equation 50 and (2N+v−1) number of restriction equations represented by Equation 51.

It is to be noted that by performing estimation in such a manner as to minimize a sum of squares of errors that occur in these equations, it is possible to suppress fluctuations in pixel values in the actual world as performing motion-blurring-mitigated image generation processing.

The following equation 52 indicates a case where the processing region is set up as shown in FIG. 23, in which errors that occur in the equations are added to the respective equations 50 and 51.

$$\begin{bmatrix} 1/v & 1/v & 1/v & 1/v & 1/v & 0 & 0 & 0 & 0 & 0 & 0 & 0 & 0 & 0 & 0 & 0 & 0 \\ 0 & 1/v & 1/v & 1/v & 1/v & 1/v & 0 & 0 & 0 & 0 & 0 & 0 & 0 & 0 & 0 & 0 & 0 \\ 0 & 0 & 1/v & 1/v & 1/v & 1/v & 1/v & 0 & 0 & 0 & 0 & 0 & 0 & 0 & 0 & 0 & 0 \\ 0 & 0 & 0 & 1/v & 1/v & 1/v & 1/v & 1/v & 0 & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 & 0 \\ 0 & 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 0 & 1/v & 1/v & 1/v & 1/v & 1/v & 0 & 0 & 0 & 0 & 0 & 0 \\ 0 & 0 & 0 & 0 & 0 & 0 & 0 & 1/v & 1/v & 1/v & 1/v & 1/v & 0 & 0 & 0 & 0 & 0 \\ 0 & 0 & 0 & 0 & 0 & 0 & 0 & 0 & 1/v & 1/v & 1/v & v & 1/v & 0 & 0 & 0 & 0 \\ 0 & 0 & 0 & 0 & 0 & 0 & 0 & 0 & 0 & 1/v & 1/v & 1/v & 1/v & 1/v & 0 & 0 & 0 \\ 0 & 0 & 0 & 0 & 0 & 0 & 0 & 0 & 0 & 0 & 1/v & 1/v & 1/v & 1/v & 1/v & 0 & 0 \\ 0 & 0 & 0 & 0 & 0 & 0 & 0 & 0 & 0 & 0 & 0 & 1/v & 1/v & 1/v & 1/v & 1/v & 0 \\ 0 & 0 & 0 & 0 & 0 & 0 & 0 & 0 & 0 & 0 & 0 & 0 & 1/v & 1/v & 1/v & 1/v & 1/v \\ \hline 1 & -1 & 0 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 & 0 \\ 0 & 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 1 & -1 & 0 & 0 & 0 \\ 0 & 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 0 & 1 & -1 & 0 \\ 0 & 0 & 0 & 0 & 0 & 0 & 0 & 0 & 0 & 0 & 0 & 0 & 0 & 0 & 0 & 1 & -1 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \begin{bmatrix} X_{-6} \\ X_{-5} \\ X_{-4} \\ X_{-3} \\ X_{-2} \\ X_{-1} \\ X_0 \\ X_1 \\ X_2 \\ X_3 \\ X_4 \\ X_5 \\ X_6 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix} + \begin{bmatrix} e_{m_{-6}} \\ e_{m_{-5}} \\ e_{m_{-4}} \\ e_{m_{-3}} \\ e_{m_{-2}} \\ e_{m_{-1}} \\ e_{m_0} \\ e_{m_1} \\ e_{m_2} \\ e_{m_3} \\ e_{m_4} \\ e_{m_5} \\ e_{m_6} \\ e_{b_0} \\ e_{b_1} \\ e_{b_2} \\ e_{b_3} \\ e_{b_4} \\ e_{b_5} \\ e_{b_6} \\ e_{b_7} \\ e_{b_8} \\ e_{b_9} \\ e_{b_{10}} \\ e_{b_{11}} \\ e_{b_{12}} \\ e_{b_{13}} \\ e_{b_{14}} \\ e_{b_{15}} \end{bmatrix} \quad (52)$$

This equation 52 can be changed into Equation 53, so that Y (=Yi) that minimizes a sum of squares E of errors given in Equation 54 is obtained as Equation 55. In Equation 55, T indicates a transposed matrix.

$$AY = X + e \quad (53)$$

$$E = |e|^2 = \Sigma emi^2 + \Sigma ebi^2 \quad (54)$$

$$Y = (A^T A)^{-1} A^T X \quad (55)$$

It is to be noted that the sum of squares of errors is such as given by Equation 56, so that by partially differentiating this sum of squares of errors, a partial differential value may be 0 as given in Equation 57, thereby enabling Equation 55 that minimizes the sum of squares of errors to be obtained.

$$\begin{aligned} E &= (A \cdot Y - X)^T (A \cdot Y - X) \\ &= Y^T \cdot A^T \cdot A \cdot Y - 2 \cdot Y^T \cdot A^T \cdot X + X^T \cdot X \end{aligned} \quad (56)$$

$$\frac{\partial E}{\partial Y} = 2(A^T \cdot A \cdot Y - A^T \cdot X) = 0 \quad (57)$$

Performing linear combination on this equation 55 allows the actual world variables ($Y_{-N-h}$, $Y_0$, and $Y_{N+h}$) to be respectively obtained, to output a pixel value of the central pixel variable $Y_0$ as a pixel value of the target pixel. For example, the calculation section 49 stores a matrix $(A^T A)^{-1} A^T$ obtained beforehand for each movement quantity and outputs the pixel value of the central pixel variable $Y_0$ as a target value based on a matrix that corresponds to the movement quantity and a pixel value of a pixel in the processing region. Performing such the processing on all of the pixels in the processing region allows actual world variables in each of which motion blurring is mitigated to be obtained for all over the screen or over a region specified by a user.

Although the above embodiment has obtained actual world variables ($Y_{-N-h}$, ..., $Y_O$, ..., $Y_{N+h}$) by using the least-squares method in such a manner as to minimize the sum of squares E of errors in AY=X+e, the following equation 58 can be given so that the number of the equations may be equal to the number of the variables. By expressing this equation as AY=X and modifying it into $Y = A^{-1} X$, it is possible also to obtain the actual world variables ($Y_{-N-h}$, ..., $Y_0$, ..., $Y_{N+h}$).

$$\begin{bmatrix} 1/v & 1/v & 1/v & 1/v & 1/v & 0 & 0 & 0 & 0 & 0 & 0 & 0 & 0 & 0 & 0 & 0 \\ 0 & 1/v & 1/v & 1/v & 1/v & 1/v & 0 & 0 & 0 & 0 & 0 & 0 & 0 & 0 & 0 & 0 \\ 0 & 0 & 1/v & 1/v & 1/v & 1/v & 1/v & 0 & 0 & 0 & 0 & 0 & 0 & 0 & 0 & 0 \\ 0 & 0 & 0 & 1/v & 1/v & 1/v & 1/v & 1/v & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 1/v & 1/v & 1/v & 1/v & 1/v & 0 & 0 & 0 & 0 & 0 & 0 \\ 0 & 0 & 0 & 0 & 0 & 0 & 1/v & 1/v & 1/v & 1/v & 1/v & 0 & 0 & 0 & 0 & 0 \\ 0 & 0 & 0 & 0 & 0 & 0 & 0 & 1/v & 1/v & 1/v & 1/v & 1/v & 0 & 0 & 0 & 0 \\ 0 & 0 & 0 & 0 & 0 & 0 & 0 & 0 & 1/v & 1/v & 1/v & v & 1/v & 0 & 0 & 0 \\ 0 & 0 & 0 & 0 & 0 & 0 & 0 & 0 & 0 & 1/v & 1/v & 1/v & 1/v & 1/v & 0 & 0 \\ 0 & 0 & 0 & 0 & 0 & 0 & 0 & 0 & 0 & 0 & 1/v & 1/v & 1/v & 1/v & 1/v & 0 \\ 0 & 0 & 0 & 0 & 0 & 0 & 0 & 0 & 0 & 0 & 0 & 1/v & 1/v & 1/v & 1/v & 1/v \\ 0 & 0 & 0 & 0 & 0 & 0 & 0 & 0 & 0 & 0 & 0 & 0 & 1/v & 1/v & 1/v & 1/v \\ 1 & -1 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \begin{bmatrix} X_{-6} \\ X_{-5} \\ X_{-4} \\ X_{-3} \\ X_{-2} \\ X_{-1} \\ X_0 \\ X_1 \\ X_2 \\ X_3 \\ X_4 \\ X_5 \\ X_6 \\ 0 \\ 0 \\ 0 \\ 0 \end{bmatrix} \quad (58)$$

The Output Section 45*a* Brings a Pixel Value of the Central Pixel variable Y0 that is obtained by the calculation section 49 into a pixel value of a target pixel that is set in the region indicated by the processing region information HZ, which is supplied from the motion vector detection section 30. Further, if the central pixel variable $Y_0$ cannot be obtained because a background region or a mixed region is indicated, a pixel value of the target pixel before the generation processing for motion-blurring-mitigated image is performed is used to generate the image data DVout.

In such a manner, even if movement of a moving object for each pixel differs from each other, it is possible to estimate an actual world by using a motion vector that corresponds to a target pixel, thereby performing accurate generation processing of the motion-blurring-mitigated image. For example, even if a moving object cannot be supposed to be rigid, it is possible to mitigate motion blurring of an image of the moving object.

Meanwhile, in the above embodiments, motion blurring of the moving object OBf is mitigated to display its image, so that, as shown in FIG. 24 even when the moving object OBf moves in an order of FIGS. 24A, 24B, and 24C, the motion blurring of this moving object OBf has been mitigated as tracking it, thereby displaying a good image thereof in which motion blurring of this moving object OBf has been mitigated. However, alternatively, by controlling a display position of an image so that the motion-blurring-mitigated image of moving object OBf may be located to a predetermined position on a screen on the basis of the moving object OBf, such an image can be displayed as to track the moving object OBf.

In this case, the motion vector detection section 30 moves a tracking point set in a region indicated by the region selection information HA in accordance with a motion vector MV, to supply the output section 45 with coordinate information HG that indicates the tracking point after this movement. The output section 45 generates such the image data DVout that the tracking point indicated by the coordinate information HG may be located to the predetermined position on the screen. It is thus possible to display an image as if the moving object OBf is being tracked.

Furthermore, generating an expanded image using the motion-blurring-mitigated image data DVout on the basis of a moving object OBf, that is, a tracking point set in a region indicated by the region selection information HA and displaying it in such a manner that the tracking point may be located to a predetermined position on the screen allows to be output the expanded image of the moving object OBf as tracking this moving object OBf as shown in FIGS. 25D-25F even if the moving object OBf moves as shown in FIGS. 25A-25C. In this case, since the expanded image of the moving object OBf is displayed up to a size of an image frame of the image, even if the display image is moved so that the tracking point may be located to the predetermined position on the screen, it is possible to prevent no-display portion from occurring on the screen. Further, in such the expanded image generation, an expanded image can be generated by repeating a pixel value of a pixel in which motion blurring is mitigated. For example, by repeating each pixel value twice, it is possible to generate an expanded image that has double vertical and horizontal sizes. Further, by using an average etc. of adjacent pixels as a new pixel value, a new pixel can be placed between these adjacent pixels to generate an expanded image. Furthermore, by using a motion-blurring-mitigated image to create a space resolution, it is possible to output a high-definition expanded image with less motion blurring. The following will describe a case where the space resolution creation is performed to generate an expanded image.

Figure 26:
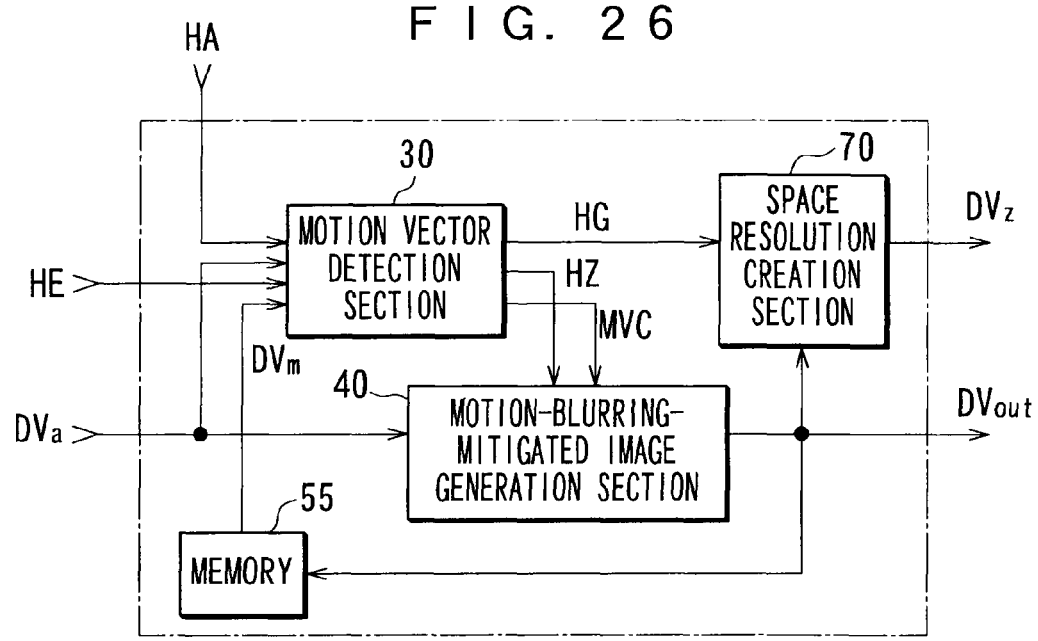
FIG. 26 is a block diagram for showing further configuration of an apparatus for processing an image.

FIG. 26 shows such another configuration of an apparatus for processing an image by which the space resolution creation may be performed to enable an expanded image to be output. It is to be noted that in FIG. 26, like components that correspond to those of FIG. 5 are indicated by like symbols, detailed description of which will be omitted.

Coordinate information HG generated by the motion vector detection section 30 is supplied to a space resolution creation section 70. Further, the image data DVout of a motion-blurring-mitigated image output from the motion-blurring-mitigated image generation section 40 is also supplied to the space resolution creation section 70.

Figure 27:
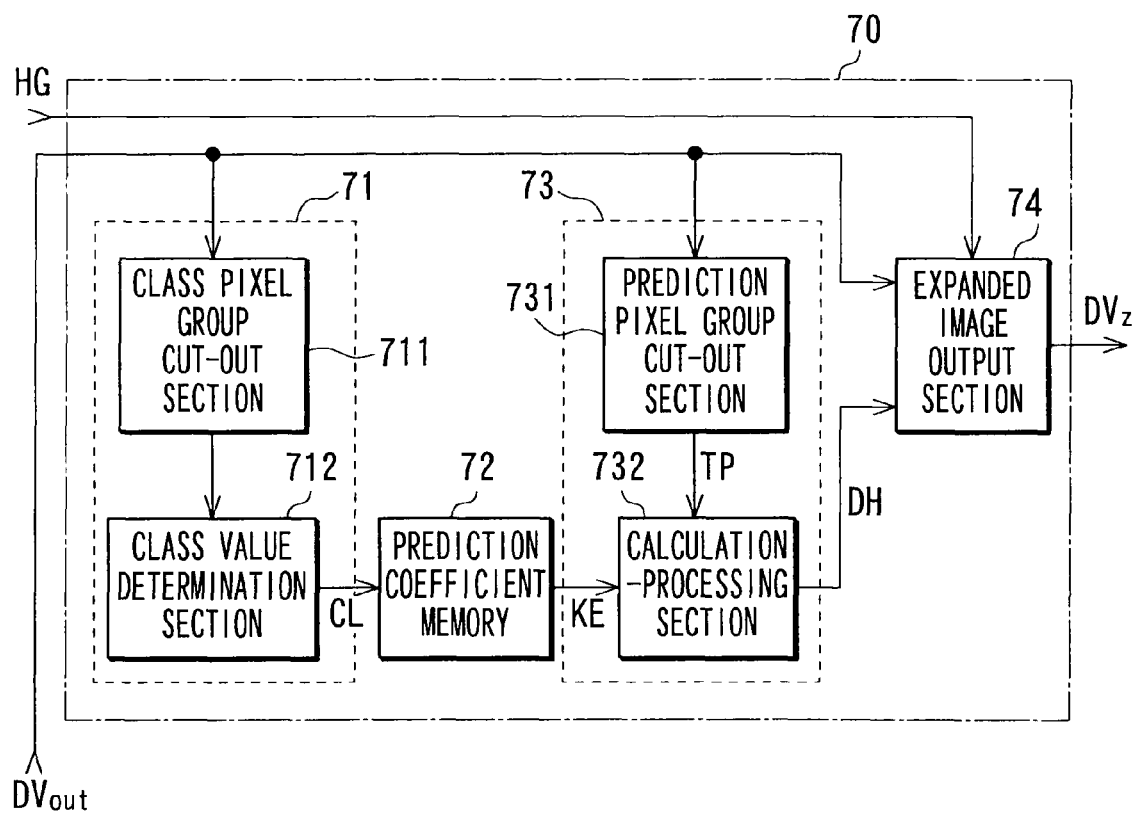
FIG. 27 is a block diagram for showing a configuration of a space resolution creation section.

FIG. 27 shows a configuration of the space resolution creation section. The motion-blurring-mitigated image data DVout is supplied to the space resolution creation section 70.

The space resolution creation section 70 comprises a class classification section 71 for classifying target pixels of the image data DVout into classes, a prediction coefficient memory 72 for outputting a prediction coefficient that corresponds to a result of classification by the class classification section 71, a prediction calculation section 73 for generating interpolation pixel data DH by performing prediction calculations by using the prediction coefficient output from the prediction coefficient memory 72 and the image data DVout, and an expanded image output section 74 for reading an image of the object OBj by as much as display pixels based on the coordinate information HG supplied from the motion vector detection section 30 and outputting image data DVz of an expanded image.

The image data DVout is supplied to a class pixel group cut-out section 711 in the class classification section 71, a prediction pixel group cut-out section 731 in the prediction calculation section 73, and the expanded image output section 74. The class pixel group cut-out section 711 cuts out pixels necessary for class classification (movement class) for the purpose of representing a degree of movement. A pixel group cut out by this class pixel group cut-out section 711 is supplied to a class value determination section 712. The class value determination section 712 calculates an inter-frame difference about pixel data of the pixel group cut out by the class pixel group cut-out section 711 and classifies, for example, absolute average values of these inter-frame differences into classes by comparing these average values to a plurality of preset threshold values, thereby determining a class value CL.

The prediction coefficient memory 72 stores prediction coefficients in it and supplies the prediction calculation section 73 with a prediction coefficient KE that corresponds to a class value CL determined by the class classification section 71.

The prediction pixel group cut-out section 731 in the prediction calculation section 73 cuts pixel data (i.e., prediction tap) TP to be used in prediction calculation out of the image data DVout and supplies it to a calculation-processing section 732. The calculation-processing section 732 performs one-dimension linear operations by using the prediction coefficient KE supplied from the prediction coefficient memory 72 and the prediction tap TP, thereby calculating interpolation pixel data DH that corresponds to a target pixel and supply it to the expanded image output section 74.

The expanded image output section 74 generates and outputs image data DVz of an expanded image from the image data DVout and the interpolation pixel data DH by reading the pixel data by as much as a display size so that a position based on the coordinate information HG may be located to a predetermined position on a screen.

By thus generating the expanded image and using the generated interpolation pixel data DH and image data DVout, it is possible to output the expanded high-quality image in which motion blurring is mitigated. For example, by generating the interpolation pixel data DH and doubling the numbers of horizontal and vertical pixels, it is possible to output a high-quality image such that a moving object OBf is doubled vertically and horizontally with its moving blurring being mitigated.

Figure 28:
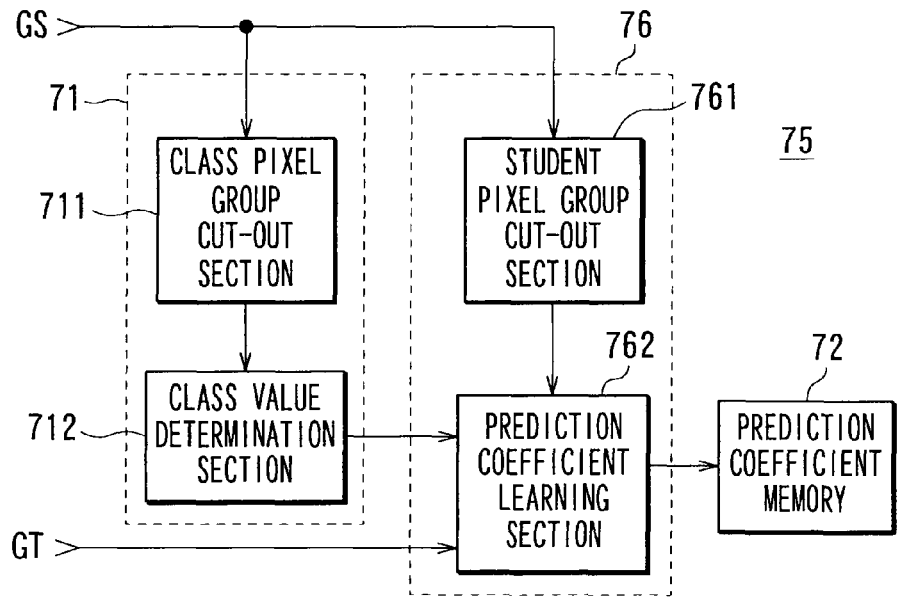
FIG. 28 is a block diagram for showing a configuration of a learning device.

It is to be noted that the prediction coefficients stored in the prediction coefficient memory 72 can be created by using a learning device shown in FIG. 28. It is also to be noted that in FIG. 28, like components that correspond to those of FIG. 27 are indicated by like symbols.

A learning device 75 comprises a class classification section 71, a prediction coefficient memory 72, and a coefficient calculation section 76. The class classification section 71 and the coefficient calculation section 76 are each supplied with image data GS of a student image generated by reducing the number of pixels of a teacher image.

The class classification section 71 cuts pixels necessary for class classification by using the class pixel group cut-out section 711 out of the image data GS of the student image, and classifies this cut-out group of pixels into classes by using pixel data of this group, thereby determining a class value thereof.

A student pixel group cut-out section 761 in the coefficient calculation section 76 cuts pixel data to be used in calculation of a prediction coefficient out of the image data GS of the student image, and supplies it to a prediction coefficient learning section 762.

The prediction coefficient learning section 762 generates a normal equation for each class indicated by the class value supplied from the class classification section 71 by using image data GT of the teacher image, the pixel data from the student pixel group cut-out section 761, and a prediction coefficient. Furthermore, it solves the normal equation in terms of the prediction coefficient by using a generic matrix solution such as the sweeping-out method and stores an obtained coefficient in the prediction coefficient memory 72.

Figure 29:
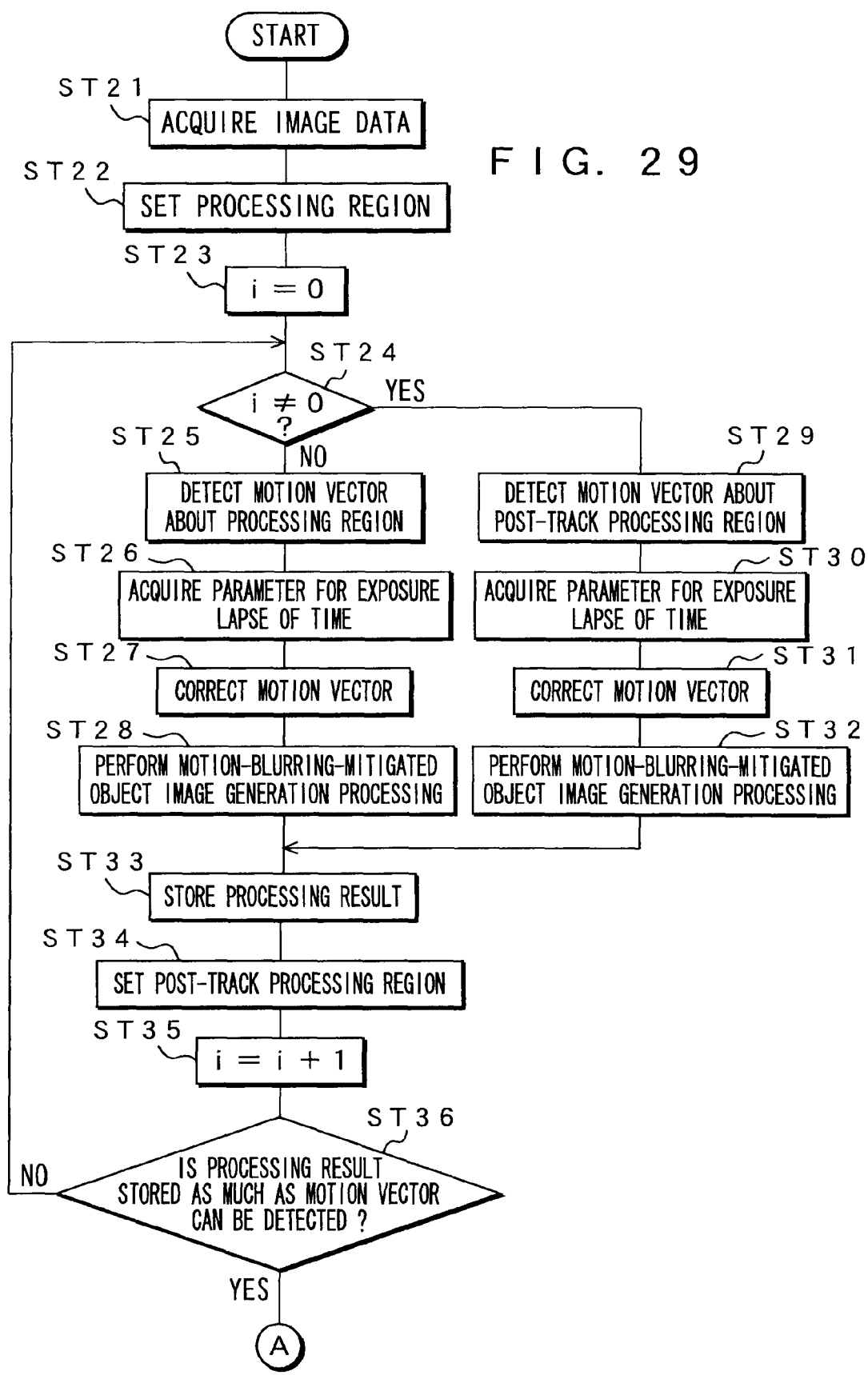
FIG. 29 is a flowchart for showing an operation (first half) in a case where space resolution creation processing is combined.
Figure 30:
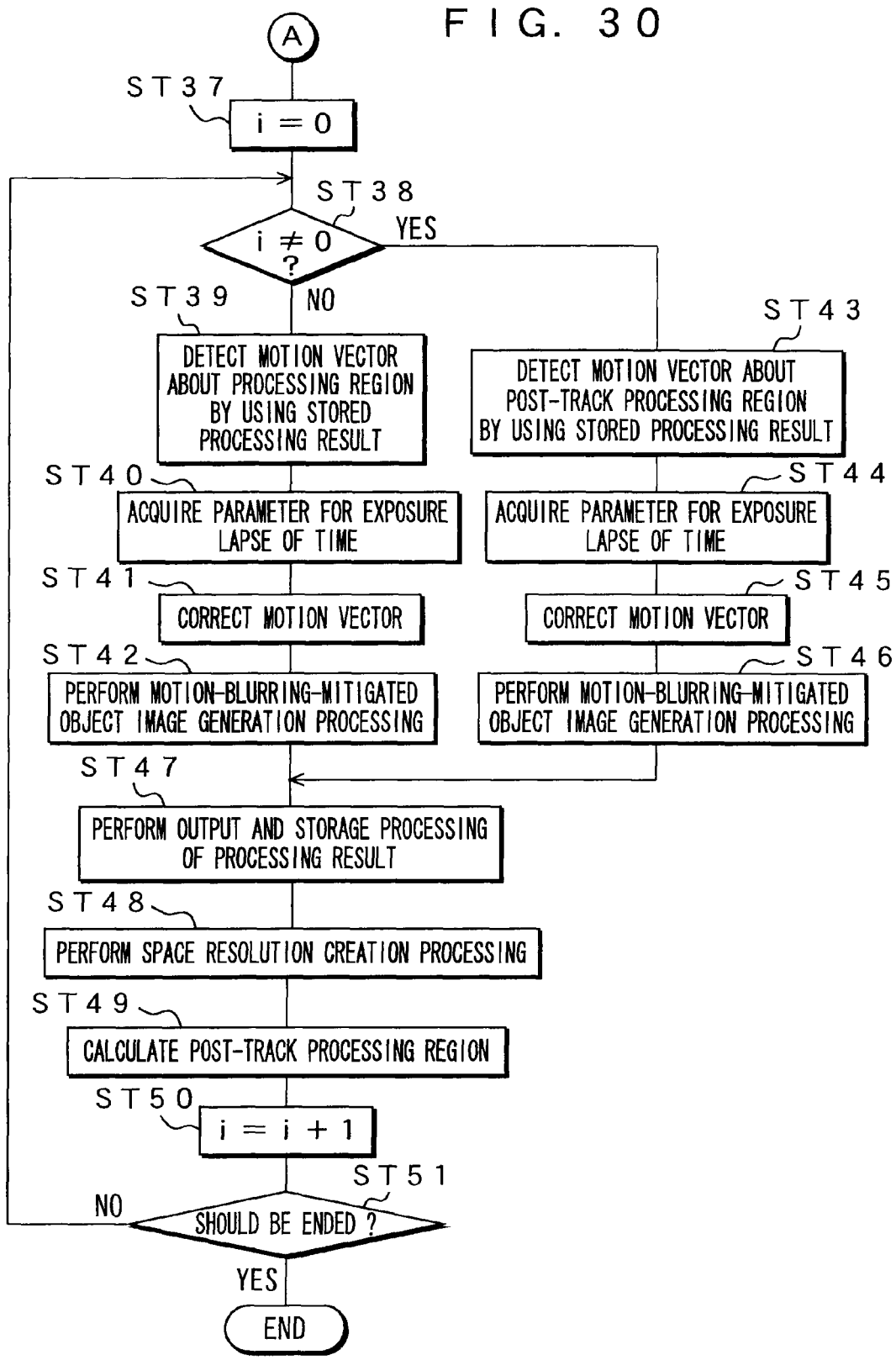
FIG. 30 is a flowchart for showing an operation (second half) in the case where the space resolution creation processing is combined.

FIGS. 29 and 30 are flowcharts each for showing operations of a case where space resolution creation processing is combined.

At step ST21, the CPU61 acquires image data DVa and the process goes to step ST22.

At step ST22, the CPU61 sets a processing region and the process goes to step ST23.

At step ST23, the CPU61 sets variable i to 0 (i=0) and the process goes to step ST24.

At step ST24, the CPU61 decides whether variable i does not equal 0 (i≠0). If not i≠0, the process goes to step ST25 and, If i≠0, the process goes to step ST29.

At step ST25, the CPU61 detects a motion vector about the processing region set up at step ST22 and the process goes to step ST26.

At step ST26, the CPU61 acquires a parameter for exposure lapse of time and the process goes to step ST27 where the motion vector detected at step ST25 is corrected in accordance with the parameter for exposure lapse of time and the process goes to step ST28.

At step ST28, the CPU61 performs motion-blurring-mitigated object image generation processing shown in FIG. 19 by using the post-correction motion vector and the image data DVa to generate a motion-blurring-mitigated image of the moving object and the process goes to step ST33.

At step ST33, the CPU61 performs storage processing on a result of the processing and combines, like step ST10 of FIG. 18, image data of motion-blurring-mitigated foreground image into background component data at a space-time position that corresponds to the motion vector obtained at step ST27, thereby generating image data DVout as a result of the processing. Furthermore, it stores image data DVout as the processing result in the storage section 63 or the RAM64 and the process goes to step ST34.

At step ST34, the CPU61 moves the processing region in accordance with movements of the moving object to set a post-track processing region and the process goes to step ST35. In this set-up of the post-track processing region, for example, a motion vector MV of the moving object OBf is detected and used. Alternatively, the motion vector detected at step ST25 or ST29 is used.

At step ST35, the CPU61 sets variable i to i+1 (i=i+1) and the process goes to step ST36.

A step ST36, the CPU61 decides whether the processing result is stored as much as the motion vector can be detected. If it is decided at this step that the motion-blurring-mitigated image data DVout is not stored as much as such a number of frames as to enable detection of the motion vector, the process returns to step ST24.

If the process returns from step ST36 to step ST24 where the CPU61 performs its processing, the variable i does not equal 0 (i≠0) so that the process goes to step ST29 where a motion vector about the post-track processing region set at step ST34 is detected and the process goes to step ST30.

At steps ST30-ST32, the CPU61 performs the same processing as those performed at steps ST26-ST28 and the process goes to step ST33. The CPU61 repeats processing starting from step ST33 until it decides at step ST36 that a result of the processing is stored as much as the motion vector can be detected, whereupon the process goes from step ST36 to step ST37 of FIG. 30.

At step ST37, the CPU61 sets variable i to 0 (i=0) and the process goes to step ST38.

At step ST38, the CPU61 decides whether i does not equal 0 (i≠0) and, if not i≠0, the process goes to step ST39 and, if i≠0, the process goes to step 43.

At step ST39, the CPU61 detects a motion vector about the processing region set at step ST22 by using the stored processing result and the process goes to step ST40.

At step ST40, the CPU61 acquires a parameter for exposure lapse of time and the process goes to step ST41 where the motion vector detected at step ST39 is corrected in accordance with the parameter for exposure lapse of time and the process goes to step ST42.

At step ST42, the CPU61 performs motion-blurring-mitigated object image generation processing by using the post-correction motion vector and the image data DVa to generate an image of moving object in which motion blurring is mitigated and the process goes to step ST47.

At step ST47, the CPU61 outputs a result of the processing and stores it, to generate image data DVout, which is the result of processing, similar to step ST33 and outputs it. Further, it stores the generated image data DVout in the storage section 63 or the RAM64.

At step ST48, the CPU61 performs space resolution creation processing by using the image data DVout generated at step ST47, to generate image data DVz of the expanded image having a display screen size in such a manner that a position indicated by the coordinate information HG may be located to a constant position on the screen.

At step ST49, the CPU61 sets a post-track processing region similar to step ST34 and the process goes to step ST50.

At step ST50, the CPU61 sets variable i to i+1 (i=i+1) and the process goes to step ST51.

At step ST51, the CPU61 decides whether it is an end of the processing. If not an end of the processing, the process returns to step ST38.

If the process returns from step ST51 to step ST38 where CPU61 performs processing of step ST38, variable i does not equal 0 (i≠0) so that the process goes to step ST43 where a motion vector about a post-track processing region is detected by using the stored processing result and the process goes to step ST44.

At steps ST44-ST46, the CPU61 performs the same processing as steps ST40-ST42 and the process goes to step ST47 where it performs processing starting from step ST47. Then, if the image data DVa is ended or its finishing operation is performed, it decides at step ST51 that the operation is ended and the processing ends.

Figure 31:
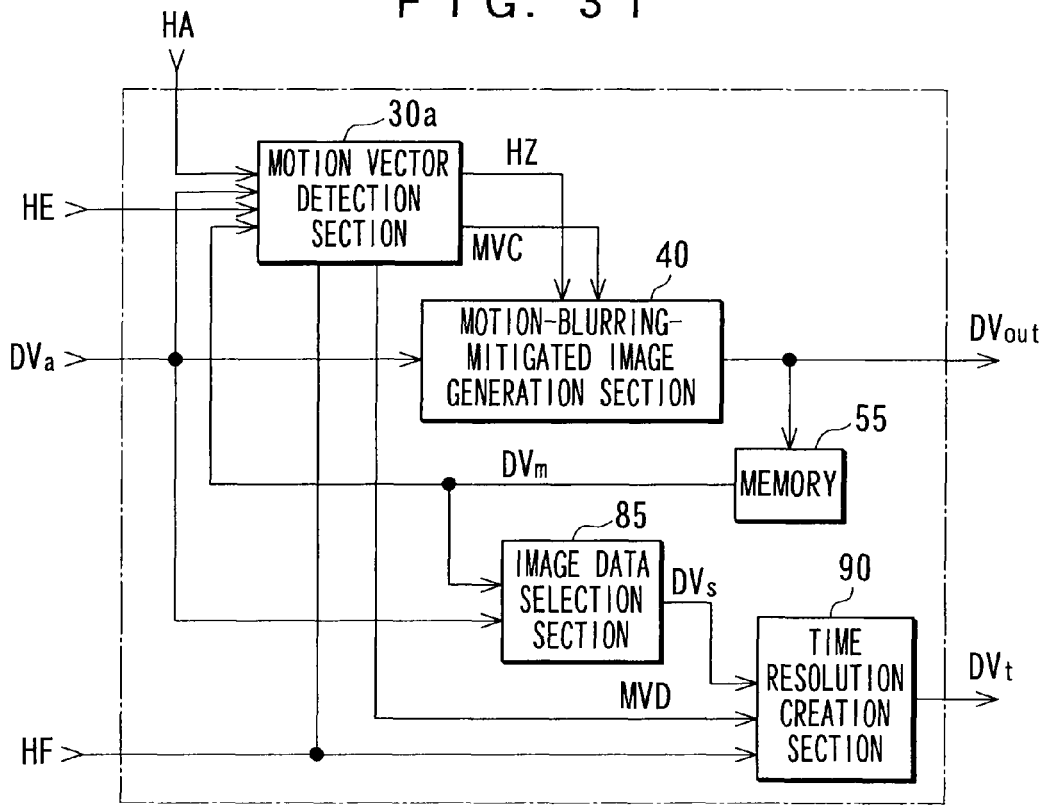
FIG. 31 is a block diagram of still further configuration of an apparatus for processing an image.

Further, it can perform not only space resolution creation by use of the motion-blurring-mitigated image data DVout but also time resolution creation disclosed in Japanese Patent Application Publication No. 2002-199349 to thereby generate a high quality image having a high time resolution. FIG. 31 shows a configuration of an apparatus for processing an image whereby a frame rate conversion may be realized while time resolution creation can be performed. In FIG. 31, like components that correspond to those of FIG. 5 are indicated by like symbols and their detailed explanation will be omitted.

Figure 32:
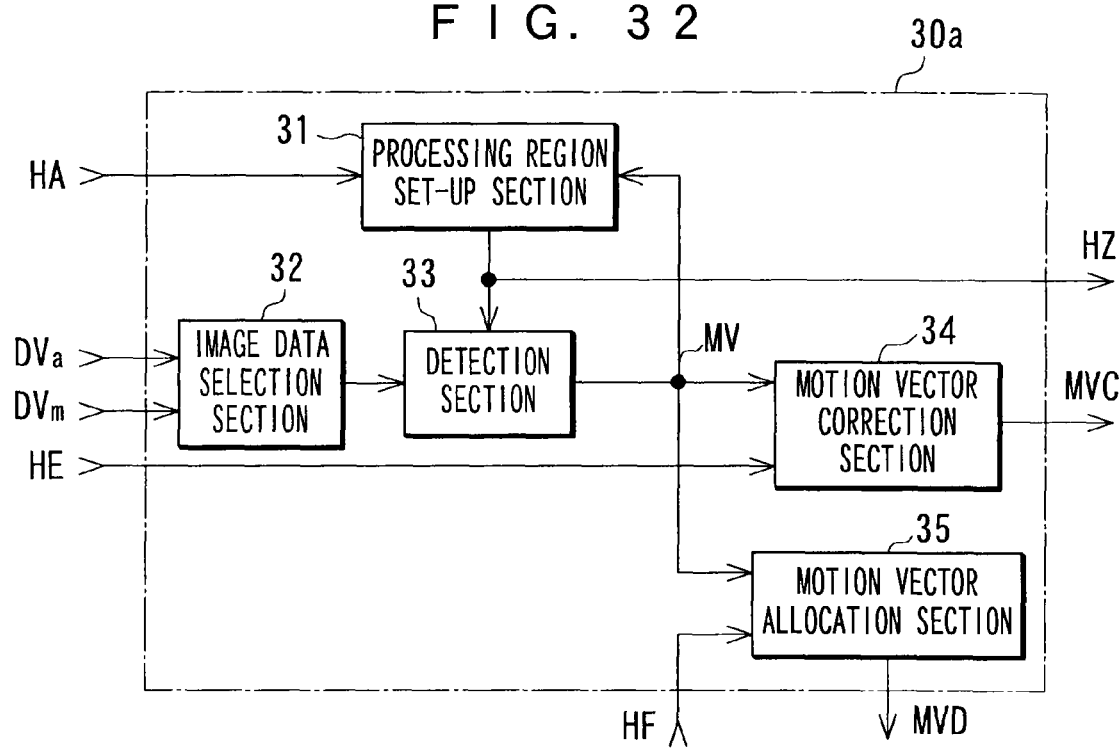
FIG. 32 is a block diagram of another configuration of a motion vector detection section.

Frequency information HF indicative of frame rates before and after the time resolution creation is supplied to a motion vector detection section 30*a* and a time resolution creation section 90. As shown in FIG. 32, the motion vector detection section 30*a* comprises the above-described motion vector detection section 30 shown in FIG. 6 plus a motion vector allocation section 35 added to it. In FIG. 32, like components that correspond to those of FIG. 6 are indicated by like symbols and their detailed explanation will be omitted.

The motion vector allocation section 35, based on the supplied frequency information HF, generates a motion vector MVD of a frame image to be generated newly, according to a motion vector MV. For example, by using the motion vector MV, it allocates motion vectors to pixels of the frame image to be generated newly and supplies a post-allocation motion vector MVD to the time resolution creation section 90.

The frequency information HF is information indicative of a rate of conversion for frame frequencies, for example, double-speed conversion, 2.5-times-speed conversion, so-called 24-60 conversion for converting a 24P-image into a 60P-image or the like.

Figure 33:
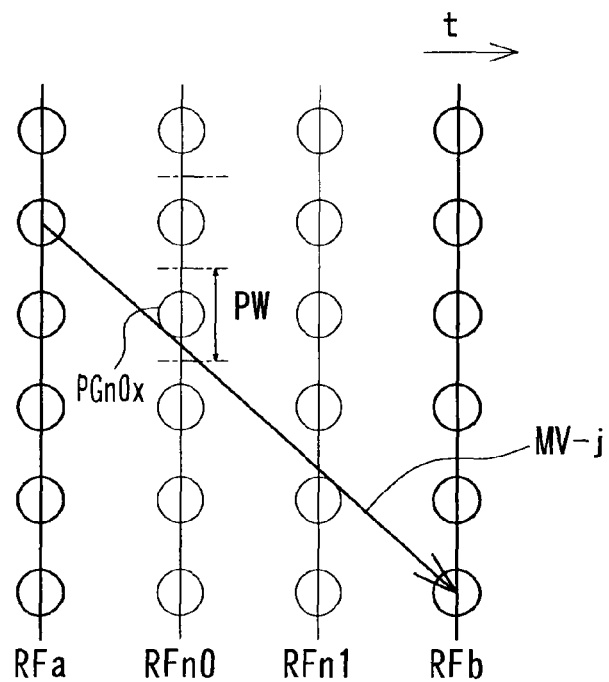
FIG. 33 is an explanatory illustration of motion vector allocation processing.

The following will describe processing to allocate motion vectors in a case where the frequency information HF indicates, for example, double-speed conversion for frames. In this case, as shown in FIG. 33, images of two frames RFn0 and RFn1 are generated newly between two frames RFa and RFb of the image data DVa. Each of the newly generated images of two frames is set as a target frame. For each of the pixels of the target frame, the motion vector allocation section 35 detects an intersecting motion vector from the motion vector MV of the image data DVa supplied from the motion vector detection section 30 and allocates this detected motion vector as a motion vector MVC of the image of the target frame. For example, if in this pixel PGn0x of the target frame PFn0, for example, motion vector MV-j intersects an image region PW for a pixel PGn0x, it allocates this motion vector MV-j as a motion vector MVC-n0x of the pixel PGn0x. Further, if multiple motion vectors intersect, it averages and allocates these multiple intersecting motion vectors. Furthermore, if no intersecting motion vector can be detected, it averages motion vectors allocated to peripheral or approximate pixels or weighs and averages them to allocation them. In such a manner, it allocates a motion vector to all of the pixels of each of the target frames.

Further, the processing region information HZ and the motion vector MVC, which are generated by the motion vector detection section 30*a*, are supplied to the motion-blurring-mitigated image generation section 40. Furthermore, image data DVm read out of the memory 55 is supplied not only to the motion vector detection section 30*a* but also to an image data selection section 85.

The image data selection section 85 selects either one of the image data DVa supplied from the image sensor 10 and the image data DVm read from the memory 55 and supplies it as image data DVs to the time resolution creation section 90.

The time resolution creation section 90 creates image data DVt having a desired frame rate based on the image data DVs, the motion vector MVD, and the frequency information HF.

Figure 34:
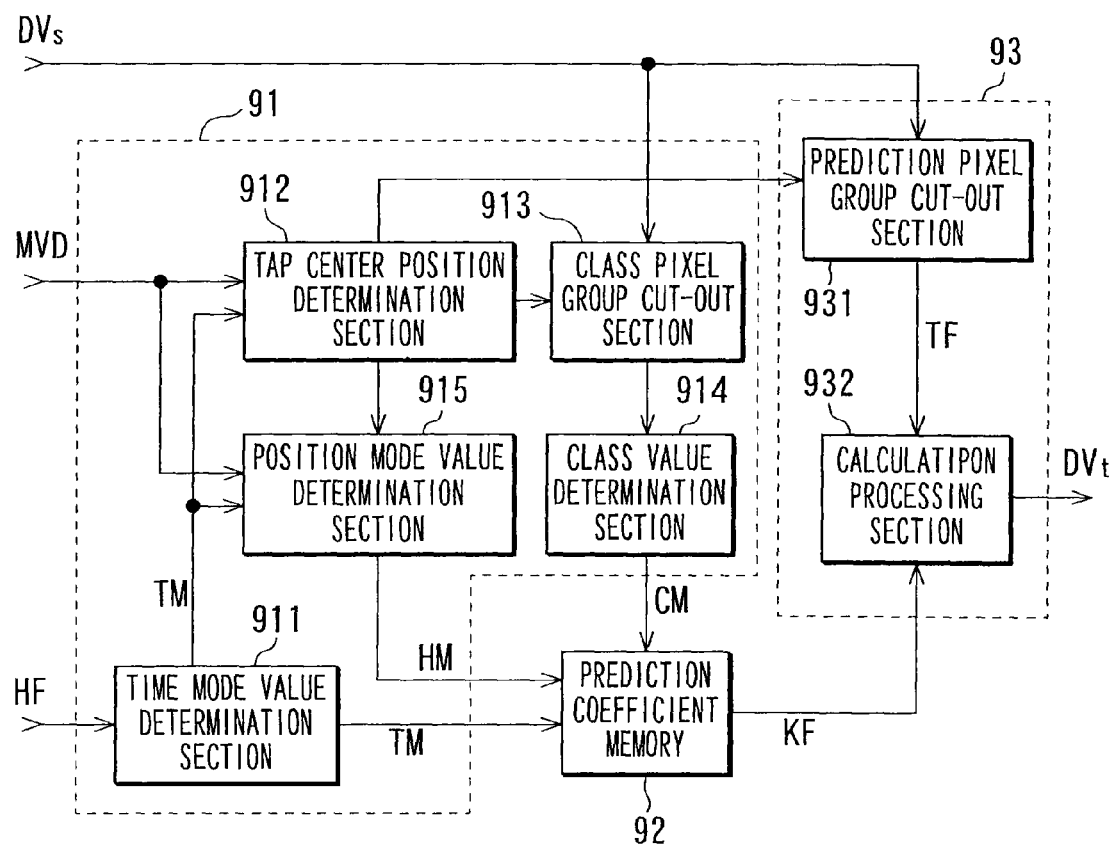
FIG. 34 is a diagram for showing a configuration of a time resolution creation section.

FIG. 34 shows a configuration of the time resolution creation section. The time resolution creation section 90 comprises a class classification section 91 for classifying target pixels of image data DVs into classes, a prediction coefficient memory 92 for outputting a prediction coefficient that corresponds to a result of class classification by the class classification section 91, and a prediction calculation section 93 for generating frame interpolation pixel data by performing prediction calculations by use of a prediction coefficient output from the prediction coefficient memory 92 and the image data DVs.

The image data DVs is supplied to a class pixel group cut-out section 913 in the class classification section 91 and a prediction pixel group cut-out section 931 in the prediction calculation section 93. Frequency information HF is supplied to a time mode value determination section 911. Further, a motion vector MVD allocated to a target pixel in a frame to be created is supplied to the time mode value determination section 912 and a position mode value determination section 915.

The time mode value determination section 911 determines a time mode value TM indicative of a time position of a frame to be created based on the supplied frequency information HF and supplies it to a tap center position determination section 912, the position mode value determination section 915, and the prediction coefficient memory 92. FIG. 35 are explanatory diagrams each for illustrating operations of the time mode value determination section 911. The time mode value determination section 911 determines a time mode value about a time position of a target frame to be created, based on frequencies before as and after conversion.

Figure 35A:
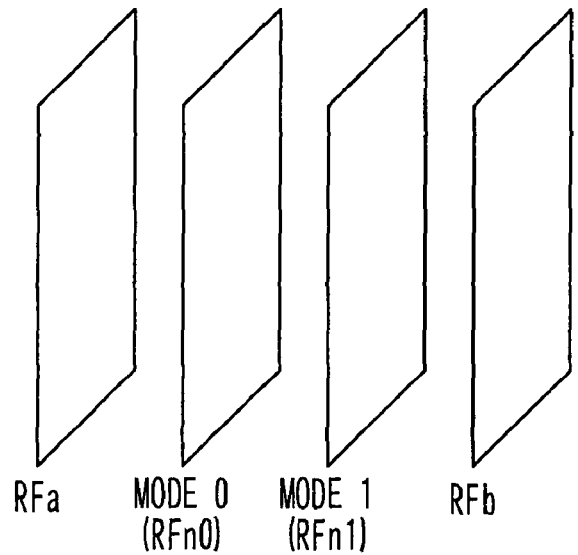
FIGS. 35A and 35B are explanatory illustrations each of operations of a time mode value determination section.
Figure 35B:
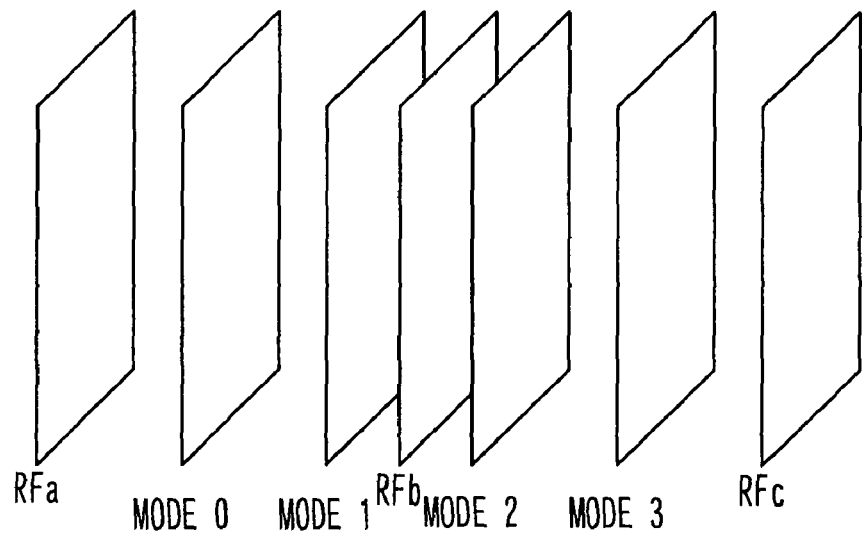

FIG. 35A shows a case where a frame frequency is doubled. In this case, as described above, the two frames RFn0 and RFn1, which are target frames, are created between the two frames RFa and RFb of the image data DVa. According to any one of the two frames RFn0 and RFn1 that is to be created, mode 0 or mode 1 is given. For example, in two frames, to create a pixel value in the target frame RFn0 ahead of the other time-wise, the time mode value is set to 0, and to create a pixel value in the other target frame RFn1, the time mode value is set to 1. FIG. 35B, on the other hand, shows a case where the frame frequency is multiplied by 2.5 in conversion, in which pixel values are created at four kinds of time-wise positions on a target frame, so that according to a coefficient of any one of the frame positions to be created, as the time mode value it takes either one of 0 through 3.

The tap center position determination section 912 uses the motion vector MVD, to determine a motion vector of a target pixel in a target frame indicated by a time mode value TM. That is, if motion vectors are already allocated by the motion vector allocation section 35 to pixels of a frame image to be newly generated, it selects a motion vector that corresponds to the target pixel. Based on this determined motion vector, positions in two frames respectively before and after the image data DVs corresponding to the target pixel in the target frame are detected and set as a tap center position TC.

The class pixel group cut-out section 913 uses this tap center position TC as a reference to cut pixels necessary for class classification for the purpose of representation of a degree of movements out of the two frames of the image data DVs respectively before and after the target frame and supplies them to a class value determination section 914.

Figure 36:
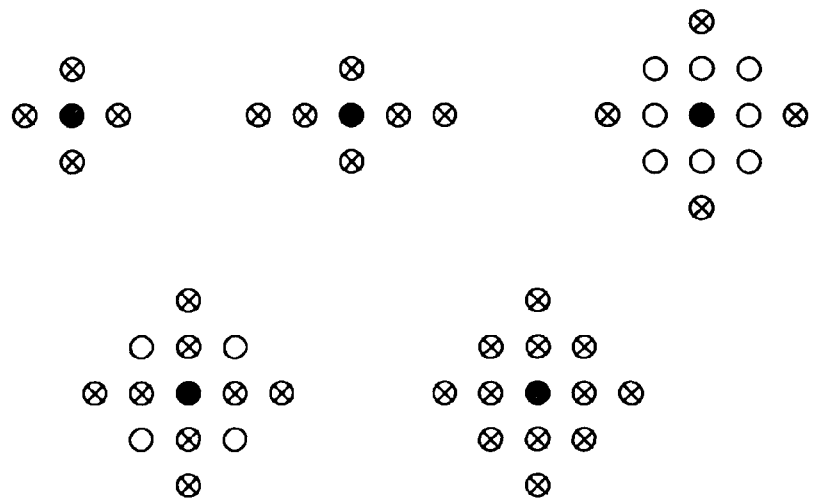
FIG. 36 is a diagram for showing a pixel group of class.

FIG. 36 shows several examples of a class pixel group taken out by the class pixel group cut-out section 913 based on the above-described tap center position TC. It is to be noted that in the figure, a pixel of the tap center position TC is indicated by a solid circle and a pixel which is positioned around the tap center position TC and used as a class pixel is indicated by a circle in which "X" is present. Such a class pixel group is cut out of the two frames of the image data DVs respectively before and after the corresponding target frame.

The class value determination section 914 calculates an inter-frame difference for pixel data of a pixel group cut out by the class pixel group cut-out section 913 and compares, for example, an absolute average value of these inter-frame differences to a plurality of preset threshold values to classify them into classes, thereby determining a class value CM.

Figure 37:
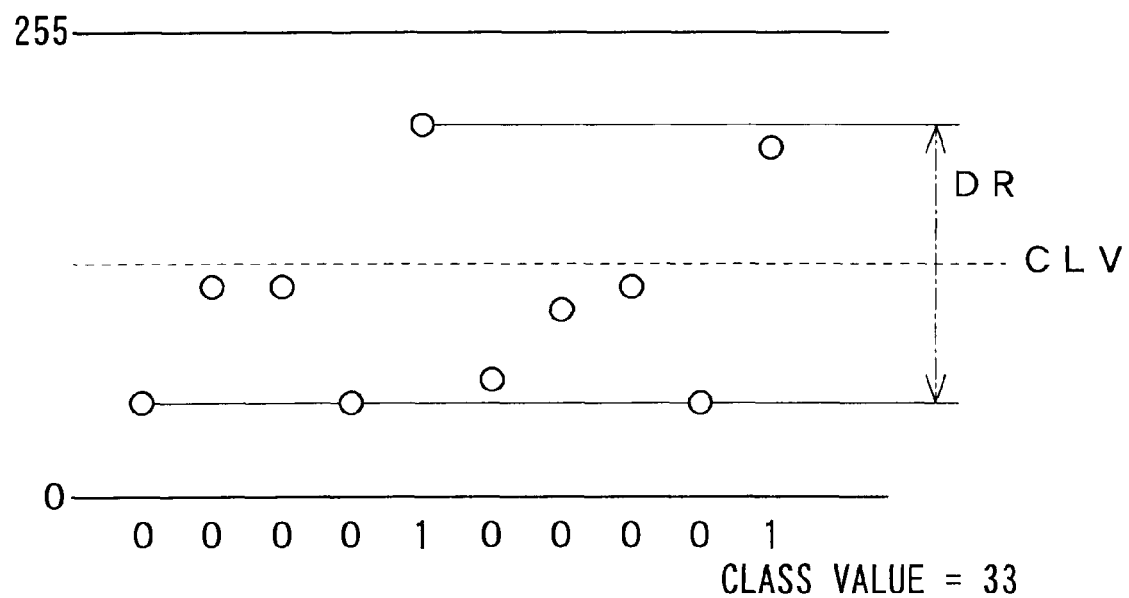
FIG. 37 is an explanatory illustration of class value determination processing.

FIG. 37 is an explanatory illustration of class value determination processing. The class value determination section 914 encodes pixel values of the cut-out class pixel group according to, for example, one-bit ADRC (adaptive dynamic range coding) and sets a value in which a result of this encoding (bit string) is assumed to be an integral value, as a class value.

It is to be noted that if the pixel value is represented in eight bits, it can take on any one of 0-255 as pixel value. In FIG. 37, it is supposed that five pixels are cut out of each of the two frames of the image data DVs respectively before and after the target frame and the total ten pixels make up a class pixel group. A difference between a maximum value and a minimum value of the class pixel values of these ten pixels makes up a dynamic range DR. Because of one-bit ADRC, a value obtained by halving the dynamic range DR is set as a middle value CLV, so that it is checked whether the class pixel values are larger or smaller than this middle value CLV. If a class pixel value is smaller than the middle value CLV, it is encoded into "0", and if a class pixel value is not smaller than the middle value CLV, it is encoded into "1". In the example of FIG. 37, a bit string of values encoded as a result of one-bit ADRC is 0000100001. An integral value of this bit string (=33) is set as a class value.

To reduce the number of classes, a value obtained by inverting a bit string of an encoding result for each bit could be used as a class value. In this case, the number of classes is halved. Further, if taps are arranged symmetrically vertically/horizontally, pixel values could be rearranged to perform the same calculations, thereby halving the number of classes respectively.

The position mode value determination section 915 determines position mode value HM based on the tap center position TC, the motion vector MVD, and the time node value TM and supplies it to the prediction coefficient memory 92. The tap center position TC is set on the basis of a notion vector that intersects a target pixel on a target frame, as described above, and a position of the target pixel, so that if a position indicative of a center of each of the pixels is used as an integer lattice point position, the tap center position TC may have a fractional (not larger than an inter-pixel distance) shift with respect to the integer lattice point position in some cases. Therefore, the position mode value determination section 915 determines a position mode value HM by performing class classification based on this fractional shift. It is to be noted that if a frame frequency is increased five-fold and one notion vector intersects a target pixel, a fractional shift with respect to an integer lattice point may come in any one of five patterns of 0, 0.2, 0.4, 0.6, and 0.8. If these fractional shifts are given in every horizontal or vertical direction, 5×5=25 combinations are possible, so that it determines 25 position mode values HM according to any one of the combinations the fractional shift corresponds to.

The prediction coefficient memory 92 reads a prediction coefficient KF that corresponds to a combination of the time mode value TM, the position mode value HM, and the class value CM, which are supplied to it, and supplies the coefficient to a calculation processing section 932 in the prediction calculation section 93.

The prediction pixel group cut-out section 931 in the prediction calculation section 93 cuts a prediction tap TF to be used in the prediction calculation out of pre-conversion image data DVs with respect to a tap center position TC determined by the tap center position determination section 912 and supplies it to the calculation processing section 932. The calculation processing section 932 performs one-dimension linear operations by using the prediction coefficient KF supplied from the prediction coefficient memory 92 and the prediction tap TF, thereby generating post-conversion image data DVt.

By thus using image data DVm after motion-blurring-mitigated image generation processing to detect a motion vector and using the detected motion vector to create a time resolution, it is possible to display movements accurately in an image after frame-rate conversion. Furthermore, if the image data selection section 85 selects the image data DVm as image data DVs, an image of a new frame can be generated by using an image in which motion blurring is mitigated. For example, if the image data DVout is of 24 frames/second, it is possible to perform the time resolution creation, thereby generating the image data DVt of an image of 60 frames/second in which motion blurring is mitigated. Further, if image data DVa is selected as the image data DVs, the image data DVt gives an image having a converted frame rate of an image obtained by the image sensor 10.

Figure 38:
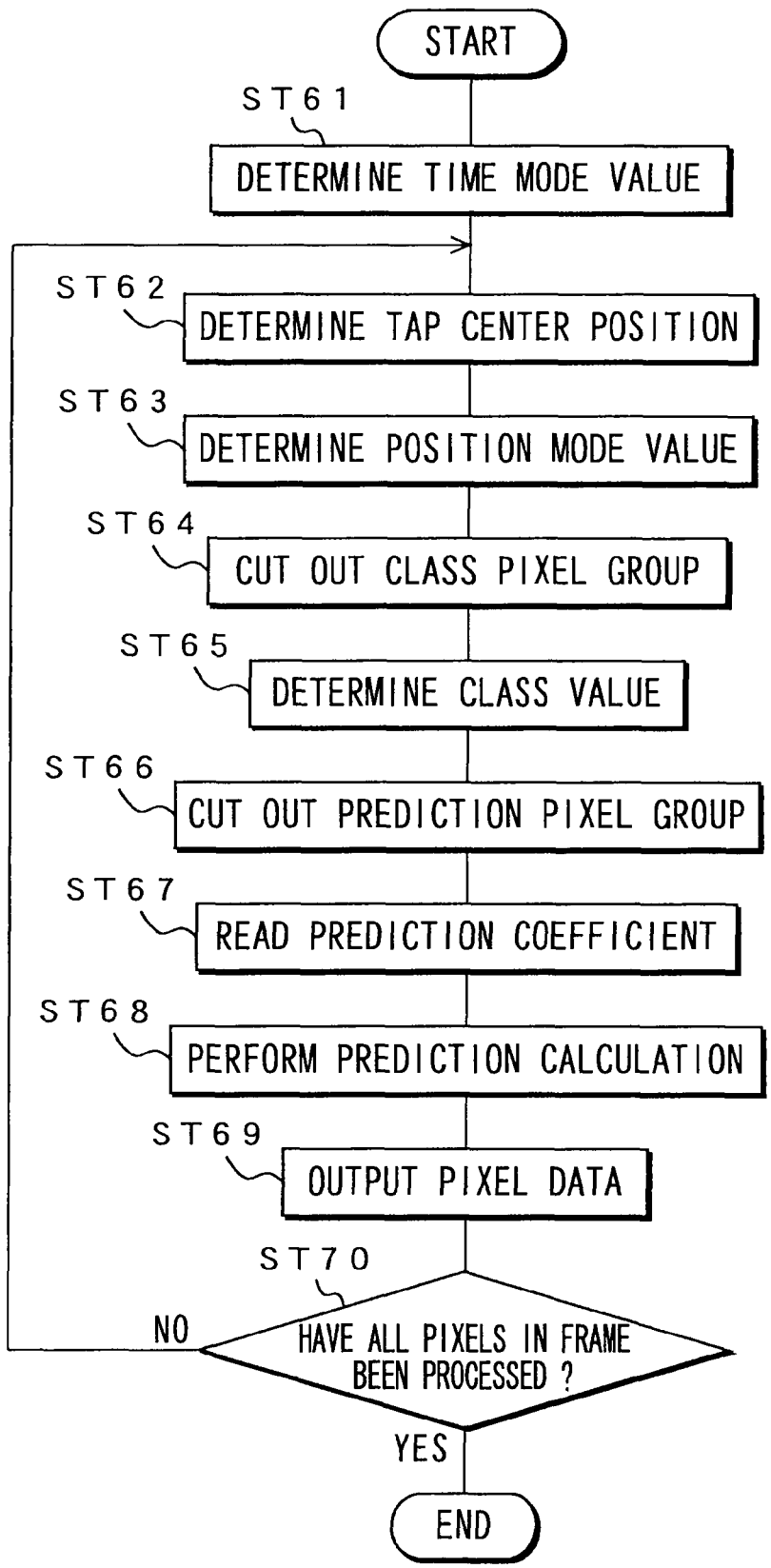
FIG. 38 is a flowchart for showing time resolution creation processing.

FIG. 38 is a flowchart of time resolution creation processing realized by software. At step ST61, the CPU61 determines a time mode value TM based on the frequency information HF. At step ST62, the CPU61 performs processing to determine a tap center position.

FIG. 39 is a flowchart of tap center position determination processing. At step ST621, the CPU61 determines a position of a target pixel on a target frame. At step ST622, the CPU61 calculates a position that corresponds to the target pixel. That is, based on a motion vector of the target pixel set up in the target frame indicated by a time mode value TM, it calculates to a decimal-place precision a position that corresponds to the target pixel in two frames of the image data DVs respectively before and after the target frame. At step ST623, it determines, as a tap center position TC, a pixel location that is closest to the calculated location that corresponds to the target pixel.

After completion of the tap center position determination processing, at step ST63, the CPU61 determines a position mode value HM. In this determination of the position mode value HM, it calculates to a decimal-place precision a position that corresponds to the target pixel at step ST622 and converts a difference between this position and the closest pixel location into a location mode value HM.

At step ST64, the CPU61 cuts out a class pixel group based on the tap center position TC determined at step ST62 and at step ST65, the CPU61 determines a class value CM based on the cut-out class pixel value group.

At step ST66, the CPU61 cuts out a prediction pixel group based on the tap center position TC determined at step ST62. At step ST67, the CPU61 reads a prediction coefficient in accordance with the class value CM, the position mode value HM, and the time mode value TM. At step ST68, the CPU61 performs one-dimension linear combination (prediction calculation) of multiple pixels in the prediction pixel group and the prediction coefficient, to generate data of the target pixel in the target frame. At step ST69, the CPU61 outputs the generated data of the target pixel as image data DVt.

At step ST70, the CPU61 decides whether the pixels in the target frame are all processed. If not processed, the process returns to step ST62 and, if the pixels in the target frame are all processed, the process ends.

The prediction coefficients stored in the prediction coefficient memory 92 can be created by using a learning device shown in FIG. 40. It is to be noted that in FIG. 40, like components that correspond to those of FIG. 34 are indicated by like symbols.

First, a frame rate is converted by using image data GT of a teacher image (which corresponds to an image of a target frame) to generate image data GS of student images (which correspond to images of image data DVs), so that the image data GS is supplied to a class classification section 94 and a coefficient calculation section 95.

A motion vector detection section 941 in the class classification section 94 detects a motion vector between a predetermined number of frames and supplies it to the tap center position determination section 912 and the position mode value determination section 915. The tap center position determination section 912 determines a tap center position as described above and supplies it to the class pixel group cut-out section 913 and a student pixel group cut-out section 951.

The student pixel group cut-out section 951 cuts a student pixel group comprised of multiple student pixels out of the image data GS according to the tap center position. The cutout student pixel group is supplied to a prediction coefficient learning section 952.

The class pixel group cut-out section 913 cuts out a class pixel group comprised of multiple student pixels according to the tap center position. The cut-out class pixel group is supplied to the class value determination section 914. The class value determination section 914 determines a class value based on the class pixel group as described above. This determined class value is supplied to the prediction coefficient learning section 952.

The position mode value determination section 915 determines a position mode value based on the tap center position, the motion vector, and the time mode value as described above and supplies it to the prediction coefficient learning section 952. Furthermore, based on the time mode value, a teacher pixel cut-out section 942 cuts out a teacher pixel. The cutout teacher pixel is supplied to the prediction coefficient learning section 952.

The prediction coefficient learning section 952 uses the time mode value, the position mode value, the class value, the student pixel group, and the teacher pixel, which are supplied thereto, to learn a prediction coefficient for predicting the teacher pixel from the student pixel group. In learning of a prediction coefficient, the prediction coefficient is determined so as to minimize a sum of squares of errors between a prediction value and a true value in a teacher image when the prediction values are estimated according to one-dimension linear operations on the student pixel and multiple prediction coefficients. By an actual calculation method, the prediction coefficient is determined so that a value obtained as a result of partial differentiation performed on an equation about a sum of squares of the errors may become 0. In this case, a normal equation is established as described above and solved by a generic matrix solution such as the sweeping-out method, to calculate a prediction coefficient. This calculated prediction coefficient is stored in the prediction coefficient memory 92.

FIG. 41 shows a flowchart of processing to learn a prediction coefficient by using software. At step ST81, the CPU61 converts a frame rate by using image data of a teacher image, to generate image data of a student image. At step ST82, the CPU61 determines a time mode value based on frequency information.

At step ST83, the CPU61 detects a motion vector of the teacher image and, at step ST84, determines a tap center position based on the time mode value and the motion vector.

At step ST85, the CPU61 determines a position mode value according to the motion vector, the tap center position, and the time mode value.

At step ST86, the CPU61 cuts a class pixel group out of the student image according to information of the tap center position. At step ST87, the CPU61 determines a class value based on the class pixel group. At step ST88, the CPU61 cuts a student pixel group out of the student image according to the information of the tap center position. At step ST89, the CPU61 cuts a teacher pixel out of the teacher image.

Steps ST90-ST95 make up processing to learn a prediction coefficient based on the least-square method. That is, the prediction coefficient is determined so as to minimize a sum of squares of errors between a prediction value and a true value in a teacher image when the prediction values are estimated according to one-dimension linear combination of the student pixel and multiple prediction coefficients. By an actual calculation method, the prediction coefficient is determined so that a value obtained as a result of partial differentiation performed on an equation about a sum of squares of the errors may become 0. In this case, a normal equation is established and solved by a generic matrix solution such as the sweeping-out method, to calculate a prediction coefficient.

At step ST90, the CPU61 performs processing to supplement data to the normal equation for each class. At step ST91, the CPU61 decides whether the pixels in the frames are all processed. If not processed, the process returns to step ST84 (determination of a tap center position). If the pixels in the frames have been all processed, the process goes to step ST92. At step ST92, the CPU61 decides whether the frames in the image are all processed. If not processed, the process returns to step ST82 and, if the frames have been all processed, the process goes to step ST93. At step ST93, the CPU61 decides whether the input images are all processed. If not processed, the process returns to step ST81. If the input images have been all processed, the process goes to step ST94. At step ST94, the CPU61 solves the normal equation by the sweeping-out method and outputs the obtained prediction coefficient at step ST95 so that it may be stored in the prediction coefficient memory 92.

FIG. 42 is a flowchart for showing operations in a case where the above-described time resolution creation processing is combined.

At step ST101, the CPU61 decides whether a result of the processing to mitigate a motion vector is stored as much as a motion vector can be detected. If not stored, the process returns to step ST101 and, if the result of the processing is stored as much as a motion vector can be detected, the process goes to step ST102.

At step ST102, the CPU61 uses the stored processing result to detect a motion vector and the process goes to step ST103.

At step ST103, the CPU61 uses the detected motion vector to allocate motion vector to each pixel in a frame to be newly created and the process goes to step ST104.

At step ST104, the CPU61 corrects the motion vector according to a parameter for exposure lapse of time acquired in motion vector mitigation processing and the process goes to step ST105.

At step ST105, the CPU61 performs the time resolution creation processing to generate image data DVt having a post-time resolution creation frame rate based on the stored processing result and the motion vector obtained at step ST104 and the process goes to step ST106.

If the image data DVa has not yet terminated or the operation is not terminated at step ST106, the process returns to step ST102 and, if the image data DVa has been terminated or the operation is terminated, it decides that the operation is finished and ends the processing.

Thus, using a motion-blurring-mitigated image allows the motion vector to be accurately detected, thereby enabling, by using the detected motion vector, a high time resolution image with less motion blurring to be obtained.

Further, if region selection information HA indicative of an image region to be subject to motion blurring processing is supplied to the image processing apparatus 20, the motion-blurring-mitigated image generation section 40 performs motion-blurring-mitigation processing on a region selected in accordance with this region selection information HA. Furthermore, it sequentially moves the processing region in accordance with a motion vector MV detected by the motion vector detection section 30. That is, the motion vector detection section 30 can track a moving object. In such a manner, only by setting up first a region in accordance with movements of a moving object, it is possible to move a processing-subject image region in such a manner as to match movements of the moving object, and to mitigate motion blurring of only a region containing the moving object, thereby efficiently mitigating the motion blurring.

Figure 43:
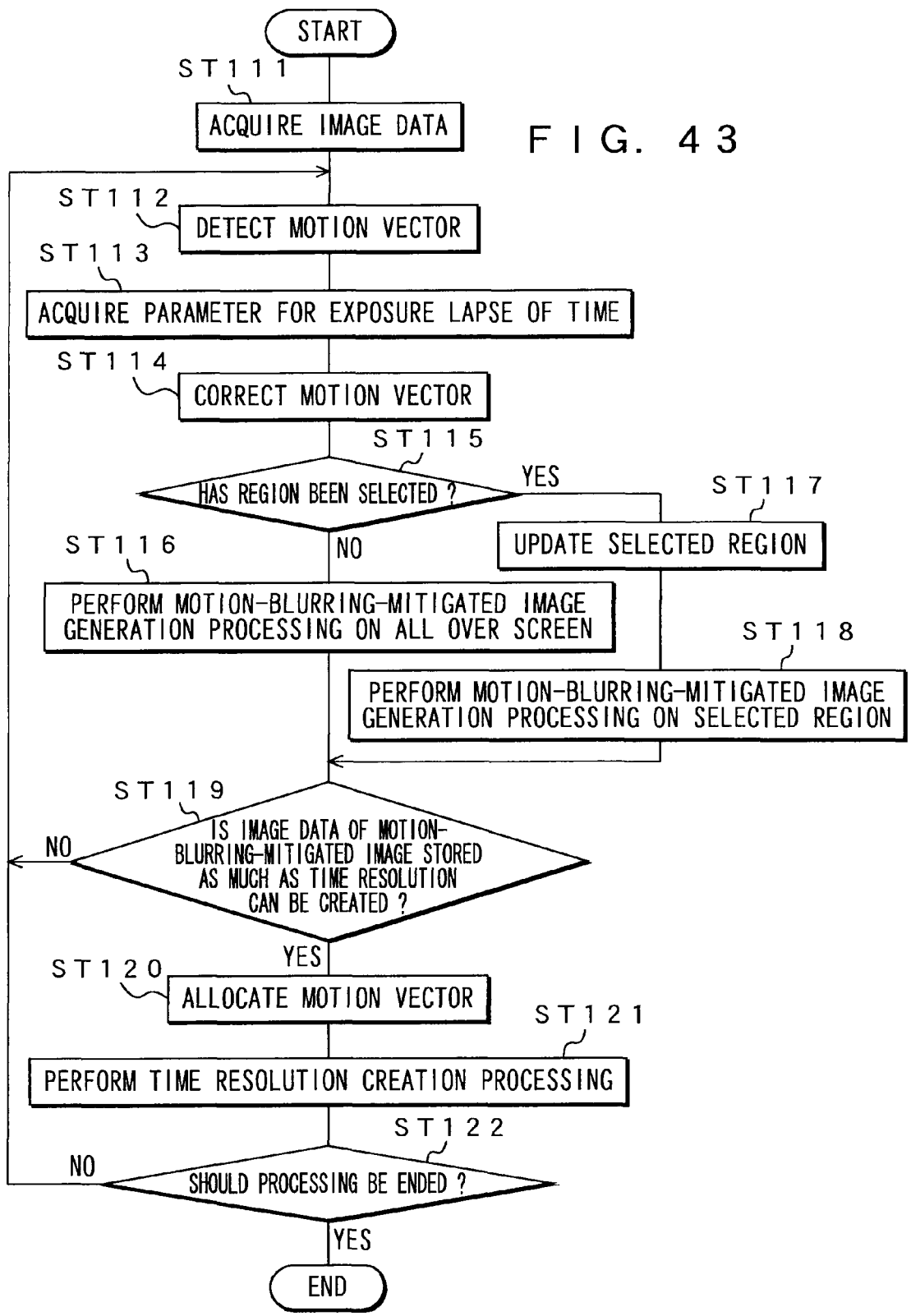
FIG. 43 is a flowchart for showing operations in a case where region selection is enabled.

FIG. 43 is a flowchart for showing operations in a case where region in which motion blurring is to be mitigated can be selected.

At step ST111, the CPU61 acquires through the input section, the communication section or the like the image data DVa generated by the image sensor 10 and allows this acquired image data DVa to be stored in the storage section 63.

At step ST112, the CPU61 detects a motion vector MV of each pixel and the process goes to step ST113.

At step ST113, the CPU61 acquires a parameter HE for exposure lapse of time and the process goes to step ST114 where the motion vector MV detected at step ST112 is corrected according to the parameter HE for exposure lapse of time, thereby generating a motion vector MVB.

At step ST115, the CPU61 decides whether an image region in which motion blurring is to be mitigated has been selected. If the image region has not yet been selected, the process goes to step ST116 where it performs motion-blurring-mitigated image generation processing on all over a screen to generate image data DVct and the process then goes to step ST119. If the image region has been selected, the process goes to step ST117 where the selected region is updated. For example, by sequentially moving a selected region whose motion blurring is to be mitigated in accordance with movements of a moving object in the selected region, the selected region can track the moving object. At step ST118, it performs motion-blurring-mitigated image generation processing on the selected region that is moved in accordance with the movements of the moving object to generate image data DVct and the process goes to step ST119.

At step ST119, the CPU61 decides whether the image data DVct of the motion-blurring-mitigated image is stores by as much as such a number of the frame that can perform time resolution creation. If not stored, the process returns to step ST112 and, if stored, the process goes to step ST120.

At step ST120, based on the frequency information HF, the CPU61 allocates motion vectors to pixels of a frame to be generated by using the motion vector MV detected at step ST112, thereby generating a motion vector MVC.

At step ST121, the CPU61 performs the time resolution creation processing to generate image data DVft of a frame to be newly created, by using the frequency information HF, the image data DVct of the motion-blurring-mitigated image, and the allocated motion vector MVC.

At step ST122, the CPU61 decides whether the processing should be terminated. If the image data DVa has not yet been terminated or a termination operation has not yet been performed, the process returns to step ST112. If the image data DVa is terminated or the termination operation is performed, it ends the processing.

By thus performing the processing, it is possible to mitigate motion blurring of a region selected in accordance with the region selection information HA and use this motion-blurring-mitigated image so that time resolution creation may be performed.

INDUSTRIAL APPLICABILITY

As described above, an apparatus for processing an image, a method for processing an image, and a program therefor related to the present invention are useful in detection of a motion vector and image processing by use of the detected motion vector, thus being well suited for image processing on a moving object.

The invention claimed is:

1. An apparatus for processing an image, said apparatus comprising:
   motion vector detection means for detecting a motion vector by using an image that is made up of multiple pixels and acquired by an image sensor having time integration effects;
   motion-blurring-mitigated image generation means for generating a motion-blurring-mitigated image in which motion blurring of a moving object is mitigated by using the motion vector detected by the motion vector detection means on the assumption that a pixel value of pixel of the moving object in the image is a value obtained by integrating, in a time direction, a pixel value of each pixel in which no motion blurring that corresponds to the moving object occur as it is moved; and
   spatial resolution creation means for generating an image that has a higher spatial resolution than that of the image made up of the multiple pixels by using the motion vector detected by the motion vector detection means and the motion-blurring-mitigated image from the motion-blurring-mitigated image generation means.

2. The apparatus for processing the image according to claim 1, wherein the motion vector detection means detects a motion vector by using multiple images, each of which is made up of multiple pixels, acquired by the image sensor and, based on the detected motion vector, generates a motion vector for the image having the higher spatial resolution to supply this motion vector to the spatial resolution creation means.

3. The apparatus for processing the image according to claim 1, wherein the motion vector detection means detects a motion vector by using multiple images, each of which is made up of multiple pixels, acquired by the image sensor, corrects the detected motion vector in accordance with exposure lapse of time, and supplies it to the motion-blurring-mitigated image generation means.

4. The apparatus for processing the image according to claim 1, wherein the spatial resolution creation means uses the motion-blurring-mitigated image to generate an image having a higher spatial resolution than that of the motion-blurring-mitigated image.

5. The apparatus for processing the image according to claim 4, wherein the spatial resolution creation means comprises:
   class determination means for determining a motion vector of a target pixel in the image, to be created, with the higher spatial resolution, by using the motion vector detected by the motion vector detection means, extracting as a class tap multiple pixels that correspond to the target pixel from the motion-blurring-mitigated image, and determining a class that corresponds to the target pixel based on a pixel value of the class tap;
   storage means for storing prediction coefficients for predicting a target pixel based on multiple pixels in a first image for each class;
   prediction value generation means for detecting from the storage means a prediction coefficient that corresponds to a class determined by the class determination means, extracting as a prediction tap multiple pixels that correspond to the target pixel in the image to be generated from the motion-blurring-mitigated image, and generating interpolated pixel data corresponding to the target pixel according to one-dimensional linear combination of the predictive coefficients detected from the storage means and the predictive tap;
   expanded image output means for generating the image that has the higher spatial resolution than that of the image made up of the multiple pixels based on the motion vector detected by the motion vector detection means and the interpolated pixel data.

6. The apparatus for processing the image according to claim 1, wherein the spatial resolution creation means generates the image that has image that has the higher spatial resolution than that of the image made up of the multiple pixels such that the image that has image that has the higher spatial resolution has twice as many vertical pixels and twice as many horizontal pixels as the image made up of the multiple pixels.

7. A method for processing an image, said method comprising:
   detecting a motion vector by using an image made up of multiple pixels acquired by an image sensor having time integration effects;
   generating a motion-blurring-mitigated image in which motion blurring of a moving object is mitigated by using the motion vector detected by the detecting on the assumption that a pixel value of pixel of the moving object in the image is a value obtained by integrating, in a time direction, a pixel value of each pixel in which no motion blurring that corresponds to the moving object occur as it is moved; and
   generating an image that has a higher spatial resolution than that of the image made up of the multiple pixels by using the motion vector detected by the detecting a motion vector and the motion-blurring-mitigated image from the generating a motion-blurring-mitigated image.

8. The method for processing the image according to claim 7, wherein in the detecting a motion vector, a motion vector by using multiple images, each of which is made up of multiple pixels, acquired by the image sensor is detected and, based on the detected motion vector, a motion vector for the image having the higher spatial resolution is generated and supplied to the generating an image.

9. The method for processing the image according to claim 7, wherein in the detecting a motion vector, a motion vector is detected by using multiple images, each of which is made up of multiple pixels, acquired by the image sensor, and the detected motion vector is corrected in accordance with exposure lapse of time and supplied to the generating a motion-blurring-mitigated image.

10. The method for processing the image according to claim 7, wherein in the generating an image, the motion-blurring-mitigated image is used to generate an image having a higher spatial resolution than that of the motion-blurring-mitigated image.

11. The method for processing the image according to claim 10, wherein the generating an image comprises:
   determining a motion vector of a target pixel in the image, to be created, with the higher spatial resolution, by using the motion vector detected by detecting a motion vector, extracting as a class tap multiple pixels that correspond to the target pixel from the motion-blurring-mitigated image, and determining a class that corresponds to the target pixel based on a pixel value of the class tap;
   storing prediction coefficients for predicting a target pixel based on multiple pixels in a first image for each class;
   detecting a prediction coefficient that corresponds to a class determined by the determining a class, extracting as a prediction tap multiple pixels that correspond to the target pixel in the image to be generated from the motion-blurring-mitigated image, and generating interpolated pixel data corresponding to the target pixel according to one-dimensional linear combination of the predictive coefficients and the predictive tap;
   generating the image that has the higher spatial resolution than that of the image made up of the multiple pixels based on the motion vector detected by the detecting a motion vector and the interpolated pixel data.

12. The method for processing the image according to claim 7, wherein generating an image generates the image that has image that has the higher spatial resolution than that of the image made up of the multiple pixels such that the image that has image that has the higher spatial resolution has twice as many vertical pixels and twice as many horizontal pixels as the image made up of the multiple pixels.

13. A non-transitory computer readable medium including computer executable instructions, wherein the instructions, when executed by a processor, cause the processor to perform a method comprising:
   detecting a motion vector by using an image made up of multiple pixels acquired by an image sensor having time integration effects;
   generating a motion-blurring-mitigated image in which motion blurring of a moving object is mitigated by using the motion vector detected by the detecting on the assumption that a pixel value of pixel of the moving object in the image is a value obtained by integrating, in a time direction, a pixel value of each pixel in which no motion blurring that corresponds to the moving object occur as it is moved; and
   generating an image that has a higher spatial resolution than that of the image made up of the multiple pixels by using the motion vector detected by the detecting a motion vector and the motion-blurring-mitigated image from the generating a motion-blurring-mitigated image.

14. An apparatus for processing an image, said apparatus comprising:
   a motion vector detector configured to detect a motion vector by using an image that is made up of multiple pixels and acquired by an image sensor having time integration effects;
   a motion-blurring-mitigated image generator configured to generate a motion-blurring-mitigated image in which motion blurring of a moving object is mitigated by using the motion vector detected by the motion vector detector on the assumption that a pixel value of pixel of the moving object in the image is a value obtained by integrating, in a time direction, a pixel value of each pixel in which no motion blurring that corresponds to the moving object occur as it is moved; and
   a spatial resolution creation unit configured to generate an image that has a higher spatial resolution than that of the image made up of the multiple pixels by using the motion vector detected by the motion vector detector and the motion-blurring-mitigated image from the motion-blurring-mitigated image generator.

15. The apparatus for processing the image according to claim 14, wherein the motion vector detector is configured to detect a motion vector by using multiple images, each of which is made up of multiple pixels, acquired by the image sensor and, based on the detected motion vector, generates a motion vector for the image having the higher spatial resolution to supply this motion vector to the spatial resolution creation unit.

16. The apparatus for processing the image according to claim 14, wherein the motion vector detector is configured to detect a motion vector by using multiple images, each of which is made up of multiple pixels, acquired by the image sensor, corrects the detected motion vector in accordance with exposure lapse of time, and supplies it to the motion-blurring-mitigated image generator.

17. The apparatus for processing the image according to claim 14, wherein the spatial resolution creation unit uses the motion-blurring-mitigated image to generate an image having a higher spatial resolution than that of the motion-blurring-mitigated image.

18. The apparatus for processing the image according to claim 17, wherein the spatial resolution creation unit comprises:
   a class determination unit configured to determine a motion vector of a target pixel in the image, to be created, with the higher spatial resolution, by using the motion vector detected by the motion vector detector, extracting as a class tap multiple pixels that correspond to the target pixel from the motion-blurring-mitigated image, and determining a class that corresponds to the target pixel based on a pixel value of the class tap;
   a storage unit configured to store prediction coefficients for predicting a target pixel based on multiple pixels in a first image for each class;
   a prediction value generator configured to detect from the storage unit a prediction coefficient that corresponds to a class determined by the class determination unit, to extract as a prediction tap multiple pixels that correspond to the target pixel in the image to be generated from the motion-blurring-mitigated image, and to generate interpolated pixel data corresponding to the target pixel according to one-dimensional linear combination of the predictive coefficients detected from the storage unit and the predictive tap;
   an expanded image output unit configured to generate the image that has the higher spatial resolution than that of the image made up of the multiple pixels based on the motion vector detected by the motion vector detector and the interpolated pixel data.

19. The apparatus for processing the image according to claim 14, wherein the spatial resolution creation unit is configured to generate the image that has image that has the higher spatial resolution than that of the image made up of the multiple pixels such that the image that has image that has the higher spatial resolution has twice as many vertical pixels and twice as many horizontal pixels as the image made up of the multiple pixels.

* * * * *